(12) United States Patent
Tran

(10) Patent No.: US 9,566,608 B2
(45) Date of Patent: *Feb. 14, 2017

(54) SMART BUILDING SYSTEMS AND METHODS

(71) Applicant: Bao Tran, Saratoga, CA (US)

(72) Inventor: Bao Tran, Saratoga, CA (US)

( * ) Notice: Subject to any disclaimer, the term of this patent is extended or adjusted under 35 U.S.C. 154(b) by 951 days.

This patent is subject to a terminal disclaimer.

(21) Appl. No.: 13/715,986

(22) Filed: Dec. 14, 2012

(65) Prior Publication Data

US 2013/0101735 A1 Apr. 25, 2013

Related U.S. Application Data

(63) Continuation of application No. 13/235,371, filed on Sep. 17, 2011, now abandoned.

(51) Int. Cl.
*B05D 5/00* (2006.01)
*G05D 23/19* (2006.01)
*F24F 5/00* (2006.01)

(52) U.S. Cl.
CPC ............. *B05D 5/00* (2013.01); *G05D 23/1923* (2013.01); *F24F 5/0021* (2013.01)

(58) Field of Classification Search
CPC .................................................... F24F 5/0021
See application file for complete search history.

(56) References Cited

U.S. PATENT DOCUMENTS

| | | |
|---|---|---|
| 1,863,924 A | 6/1932 | Dunn |
| 2,083,039 A | 6/1937 | Searls |
| 2,305,269 A | 12/1942 | Moreland |
| 2,606,334 A | 8/1952 | Vaden et al. |
| 2,800,457 A | 7/1957 | Green et al. |
| 2,800,458 A | 7/1957 | Green et al. |
| 2,892,439 A | 6/1959 | Dynia |
| 2,911,157 A | 11/1959 | Converse |
| 2,932,127 A | 4/1960 | Prance et al. |
| 3,272,897 A | 9/1966 | Herman et al. |
| 3,321,795 A | 5/1967 | Richardson |
| 3,516,941 A | 6/1970 | Matson |
| 3,539,268 A | 11/1970 | Stebbins |
| 3,577,515 A | 5/1971 | Vandegaer |
| 3,720,198 A | 3/1973 | Laing et al. |
| 3,724,016 A | 4/1973 | Soffer |
| 3,802,511 A | 4/1974 | Good |
| 3,844,449 A | 10/1974 | Alter |
| 3,879,140 A | 4/1975 | Ritter |
| 3,929,716 A | 12/1975 | Komoto et al. |
| 3,945,571 A | 3/1976 | Rash |
| 3,962,560 A | 6/1976 | Braathen |
| 4,017,449 A | 4/1977 | Audykowski et al. |
| 4,020,210 A | 4/1977 | Geer |
| 4,053,446 A | 10/1977 | Watabe et al. |
| 4,090,088 A | 5/1978 | McMahon et al. |

(Continued)

*Primary Examiner* — Xiao Zhao
(74) *Attorney, Agent, or Firm* — Tran & Associates

(57) ABSTRACT

Systems and methods are disclosed to fabricate a building structure by mixing a texture aggregate filler mixed with a phase change material (PCM), said filler including one of: perlite, glass microballoons, glass bubbles, phenolic microballoons, and microspheres; and placing the PCM with the filler on a surface exposed to a conditioned air flow to increase thermal contact between the PCM and the conditioned air flow.

19 Claims, 18 Drawing Sheets

(56) References Cited

U.S. PATENT DOCUMENTS

| | | |
|---|---|---|
| 4,100,103 A | 7/1978 | Foris et al. |
| 4,102,800 A | 7/1978 | Popoff et al. |
| 4,111,189 A | 9/1978 | Dizon |
| 4,135,101 A | 1/1979 | Young et al. |
| 4,150,662 A | 4/1979 | Summers |
| 4,175,300 A | 11/1979 | McGlew |
| 4,178,727 A | 12/1979 | Prusinski et al. |
| 4,213,058 A | 7/1980 | Townsend |
| 4,237,023 A | 12/1980 | Johnson et al. |
| 4,241,782 A | 12/1980 | Schoenfelder |
| 4,259,401 A | 3/1981 | Chahroudi et al. |
| 4,317,049 A | 2/1982 | Schweppe |
| 4,341,649 A | 7/1982 | Burns et al. |
| 4,378,402 A | 3/1983 | Below |
| 4,379,071 A | 4/1983 | Schnoring et al. |
| 4,396,723 A | 8/1983 | Temple et al. |
| 4,449,178 A | 5/1984 | Blau, Jr. et al. |
| 4,472,640 A | 9/1984 | Elmer |
| 4,487,805 A | 12/1984 | Sellstrom |
| 4,487,806 A | 12/1984 | Sellstrom et al. |
| 4,498,459 A | 2/1985 | Korin et al. |
| 4,504,402 A | 3/1985 | Chen et al. |
| 4,513,053 A | 4/1985 | Chen et al. |
| 4,547,429 A | 10/1985 | Greiner |
| 4,552,811 A | 11/1985 | Brown et al. |
| 4,587,279 A | 5/1986 | Salyer et al. |
| 4,617,332 A | 10/1986 | Salyer et al. |
| 4,622,267 A | 11/1986 | Riecke |
| 4,644,320 A | 2/1987 | Carr et al. |
| 4,711,813 A | 12/1987 | Salyer |
| 4,747,240 A | 5/1988 | Voisinet et al. |
| 4,756,958 A | 7/1988 | Bryant et al. |
| 4,797,160 A | 1/1989 | Salyer |
| 4,825,939 A | 5/1989 | Salyer et al. |
| 4,835,706 A | 5/1989 | Asahi |
| 4,868,412 A | 9/1989 | Owens |
| 4,904,709 A | 2/1990 | Hermele |
| 4,908,166 A | 3/1990 | Salyer |
| 4,964,402 A | 10/1990 | Grim et al. |
| 4,980,400 A | 12/1990 | Sessa et al. |
| 4,988,543 A | 1/1991 | Houle et al. |
| 5,007,478 A | 4/1991 | Sengupta |
| 5,053,444 A | 10/1991 | Trotoir |
| 5,053,446 A | 10/1991 | Salyer |
| 5,106,520 A | 4/1992 | Salyer |
| 5,114,617 A | 5/1992 | Smetana et al. |
| 5,205,318 A | 4/1993 | Massaro et al. |
| 5,211,949 A | 5/1993 | Salyer |
| 5,220,807 A | 6/1993 | Bourne et al. |
| 5,225,455 A | 7/1993 | Sessa et al. |
| 5,237,305 A | 8/1993 | Ishikuro et al. |
| 5,254,380 A | 10/1993 | Salyer |
| 5,282,994 A | 2/1994 | Salyer |
| 5,349,798 A | 9/1994 | Gross |
| 5,370,814 A | 12/1994 | Salyer |
| RE34,880 E | 3/1995 | Salyer |
| 5,415,222 A | 5/1995 | Colvin et al. |
| 5,436,510 A | 7/1995 | Gilbert |
| 5,442,335 A | 8/1995 | Cantin et al. |
| 5,477,917 A | 12/1995 | Salyer |
| 5,523,631 A | 6/1996 | Fishman et al. |
| 5,532,039 A | 7/1996 | Payne et al. |
| 5,543,667 A | 8/1996 | Shavit et al. |
| 5,544,036 A | 8/1996 | Brown, Jr. et al. |
| 5,553,662 A | 9/1996 | Longardner et al. |
| 5,565,132 A | 10/1996 | Salyer |
| 5,566,085 A | 10/1996 | Marceau et al. |
| 5,571,878 A | 11/1996 | Latiolais et al. |
| 5,574,078 A | 11/1996 | Elwakil |
| 5,618,860 A | 4/1997 | Mowrer et al. |
| 5,625,236 A | 4/1997 | Lefebvre et al. |
| 5,627,759 A | 5/1997 | Bearden et al. |
| 5,631,312 A | 5/1997 | Takada et al. |
| 5,638,297 A | 6/1997 | Mansour et al. |
| 5,761,083 A | 6/1998 | Brown, Jr. et al. |
| 5,762,266 A | 6/1998 | Okumura et al. |
| 5,927,598 A | 7/1999 | Broe |
| 5,942,026 A | 8/1999 | Erlichman et al. |
| 5,956,462 A | 9/1999 | Langford |
| 5,959,368 A | 9/1999 | Kubo et al. |
| 6,046,513 A | 4/2000 | Jouper et al. |
| 6,067,482 A | 5/2000 | Shapiro |
| 6,084,702 A | 7/2000 | Byker et al. |
| 6,099,894 A | 8/2000 | Holman |
| 6,103,003 A | 8/2000 | Ledbetter |
| 6,157,008 A | 12/2000 | Brown et al. |
| 6,168,093 B1 | 1/2001 | Greer |
| 6,230,444 B1 | 5/2001 | Pause |
| 6,269,274 B1 | 7/2001 | Steinman et al. |
| 6,278,909 B1 | 8/2001 | Thibeault et al. |
| 6,348,777 B1 | 2/2002 | Brown et al. |
| 6,477,063 B2 | 11/2002 | Ishii et al. |
| 6,487,509 B1 | 11/2002 | Aisa |
| 6,493,643 B1 | 12/2002 | Aisa |
| 6,553,418 B1 | 4/2003 | Collins et al. |
| 6,619,049 B1 | 9/2003 | Wu |
| 6,624,532 B1 | 9/2003 | Davidow et al. |
| 6,633,823 B2 | 10/2003 | Bartone et al. |
| 6,703,127 B2 | 3/2004 | Davis |
| 6,772,052 B1 | 8/2004 | Amundsen et al. |
| 6,832,135 B2 | 12/2004 | Ying |
| 6,861,956 B2 | 3/2005 | Ying |
| 6,862,498 B2 | 3/2005 | Davis et al. |
| 7,010,363 B2 | 3/2006 | Donnelly |
| 7,783,390 B2 | 8/2010 | Miller |
| 2002/0018901 A1 | 2/2002 | Cunningham |
| 2002/0061380 A1 | 5/2002 | Corpus et al. |
| 2002/0072868 A1 | 6/2002 | Bartone et al. |
| 2002/0098313 A1 | 7/2002 | Nagatsu |
| 2003/0012918 A1 | 1/2003 | Torbal et al. |
| 2003/0050737 A1 | 3/2003 | Osann |
| 2003/0233201 A1 | 12/2003 | Horst et al. |
| 2004/0078153 A1 | 4/2004 | Bartone et al. |
| 2004/0095237 A1 | 5/2004 | Chen et al. |
| 2004/0154264 A1 | 8/2004 | Colbert |
| 2004/0170806 A1* | 9/2004 | Hittle .................. B32B 5/22 428/141 |
| 2004/0186671 A1 | 9/2004 | Golder et al. |
| 2004/0190211 A1 | 9/2004 | Ockert et al. |
| 2005/0035482 A1* | 2/2005 | Hartmann ............. C08J 3/226 264/140 |
| 2005/0120492 A1 | 6/2005 | Koo et al. |
| 2006/0063001 A1 | 3/2006 | Hart et al. |
| 2006/0246256 A1 | 11/2006 | Ausen et al. |
| 2008/0188152 A1 | 8/2008 | Tsai et al. |
| 2009/0017311 A1 | 1/2009 | Kislig |
| 2009/0155621 A1 | 6/2009 | Suzuki et al. |
| 2009/0223160 A1 | 9/2009 | Hittle |
| 2009/0305016 A1 | 12/2009 | Miyoshi et al. |
| 2010/0078499 A1 | 4/2010 | Sulzer |
| 2010/0087115 A1 | 4/2010 | Davis et al. |
| 2011/0027568 A1 | 2/2011 | Nihlstrand |
| 2011/0108758 A1 | 5/2011 | Driscoll |
| 2011/0120040 A1 | 5/2011 | Alderman |
| 2013/0228308 A1* | 9/2013 | Abhari .................. C09K 5/063 165/104.17 |
| 2014/0166232 A1* | 6/2014 | Al-Hallaj ............. F24J 3/083 165/11.1 |

\* cited by examiner

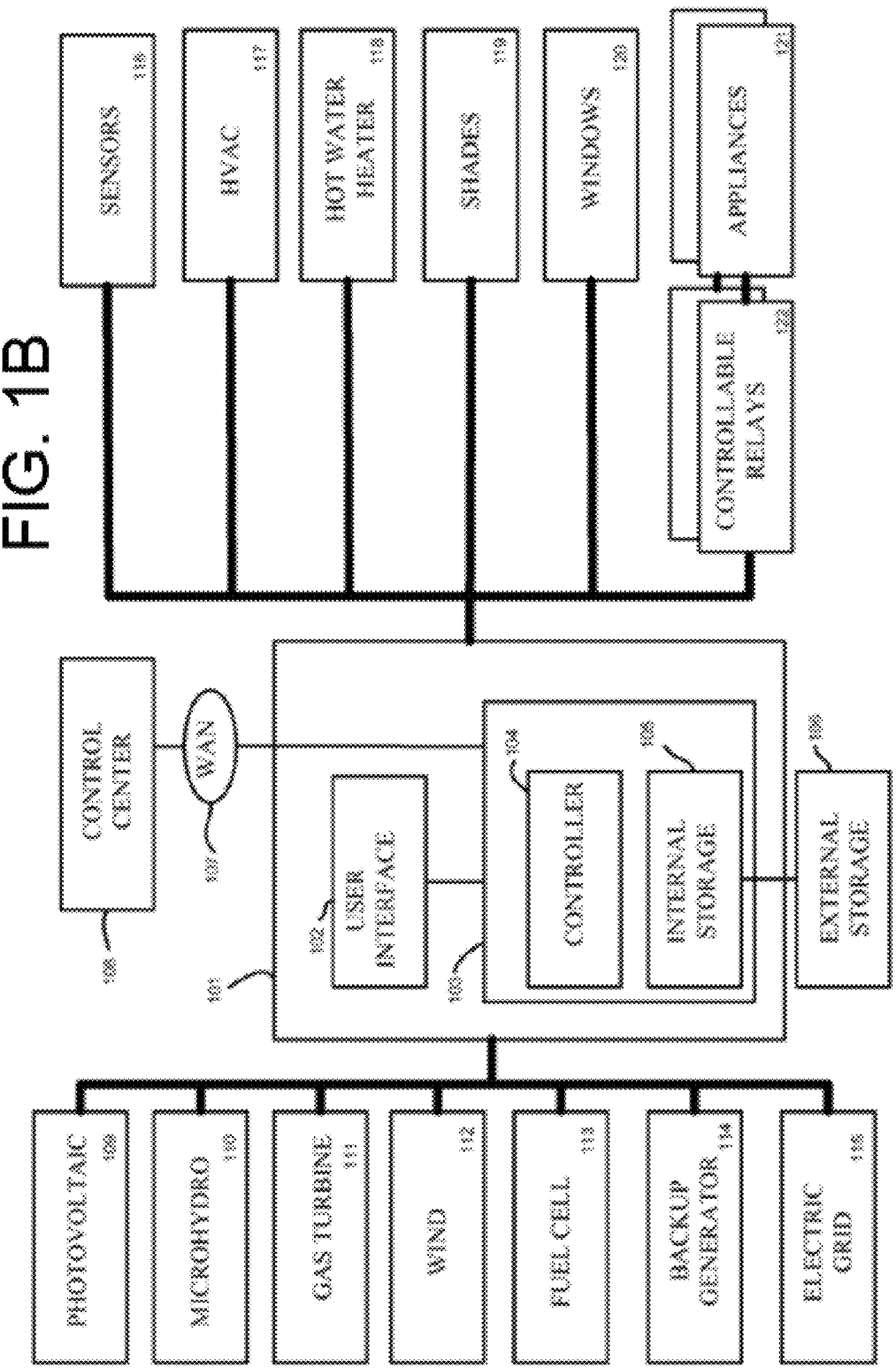

SMART BUILDING SYSTEMS AND METHODS

This application claims priority to application Ser. No. 13/235,371, filed 17 Sep. 2011, the content of which is incorporated by reference.

BACKGROUND

The present invention relates to smart building.

The ever increasing need for electricity has historically been satisfied by building more power plants. However, the projected load growth and other external forces are pointing to projected peak capacity shortage in the near future. One option to meet peak demand is called demand-response (DR). DR uses technology and incentives to change electricity consumption by end-use customers. It can result in a reduction in energy consumption at times of peak use and at times of high wholesale market prices. DR offers benefits to both utilities and consumers in the form of increased electric system reliability and reduced price volatility. It uses a wide range of technologies offering a variety of options for both peaking and energy capacities across the electrical system.

Energy demand at a premise varies over the time of day. In a typical home there is a peak in the morning when the family gets up, turns on lights, radios and televisions, cooks breakfast, and heats hot water to make up for the amount used in showers. When the family leaves for work and school it may leave the clothes washer and dishwasher running, but when these are done, demand drops to a lower level but not to zero as the air conditioners, refrigerators, hot waters and the like continue to operate. Usage goes up as the family returns, peaking around dinner when the entire family is home. This creates the typical "double hump" demand curve. Businesses tend to follow different patterns depending on the nature of the business. Usage is low when the office is closed and relatively constant when the office is open. In extreme climates where air conditioning cannot be cut back overnight, energy use over the course of the day is more constant. Businesses such as restaurants may start later in morning and their peaks extend farther into the evening. A factory with an energy intensive process operating three shifts may show little or variation over the course of the day.

SUMMARY

In one aspect, systems and methods are disclosed to fabricate a building structure includes depositing a phase change material (PCM) on a surface exposed to a conditioned air flow; and forming air channels on the PCM to increase thermal contact between the PCM and the conditioned air flow.

In another aspect, a method to fabricate a building structure mixing a texture aggregate filler mixed with a phase change material (PCM), said filler being selected from the group consisting of perlite, glass microballoons, glass bubbles, phenolic microballoons, and microspheres; and placing the PCM with the filler on a surface exposed to a conditioned air flow to increase thermal contact between the PCM and the conditioned air flow.

Implementations of the above aspect may include one or more of the following. The building structure comprises a ceiling tile or an underfloor air distribution (UFAD) panel. The process includes forming elongated hollow PCM structures. The elongated hollow PCM structures are fabricated in advance and attached to the building material during fabrication or during shipping. The elongated hollow PCM structures are formed by dipping a scaffold into melted PCM. The process includes extruding the elongated hollow PCM structures with a predetermined cross-sectional shape. The cross-sectional shape comprises one of: circular, hexagonal, rectangular, octahedron. The process includes forming a first layer of elongated hollow PCM structures and a second layer of elongated hollow PCM structures above the first layer. The process includes forming air channels with grooves positioned on two adjacent sides of the building materials to allow air flow through the PCM regardless of orientation of the building material. The process includes spraying PCM onto the surface before forming air channels with a shaped tool. The process includes pouring PCM onto the surface before forming air channels with a shaped stamping tool. The process includes rolling PCM onto the surface before forming air channels with a shaped roller. The process includes dipping the surface into PCM and then forming the air channels with a shaped tool. The process includes microencapsulating the PCM. The process includes characterizing PCM properties and predicting building performance with the characterized PCM properties. The process includes pre-charging a building by cooling the PCM during a period of non-peak energy consumption and reducing energy consumption during a peak period.

In another aspect, a method to fabricate a building structure includes mixing a phase change material (PCM) with a texture aggregate filler, said filler being selected from the group consisting of perlite, glass microballoons, glass bubbles, phenolic microballoons, and microspheres; spraying the aggregate filler PCM on a surface exposed to a conditioned air flow to increase thermal contact between the PCM and a conditioned air flow.

Implementations of the above aspect may include one or more of the following. The process includes rolling the texture on the PCM with a roller. The process includes using a crow's foot stomp brush to form a texture to thermally interact with the air flow. The process includes stamping a texture on the PCM.

Advantages of the preferred embodiments may include one or more of the following. The system uses PCM thermal storage materials that are capable of storing large amounts of thermal energy that can be useful in moderating daytime nighttime temperature fluctuations. Buildings can use low cost, lightweight structures utilizing PCM to reduce cycling of heating and cooling machinery and cause the buildings temperatures to more closely remain in the comfort zone for occupants. The PCMs increase the thermal inertia of the envelope of buildings, rooms and other spaces to facilitate temperature control and to allow utilization of short duration energy sources on a longer period. For instance, during the heating season, thermal inertia stores excess solar heat reducing overheating and restores the heat at night reducing the heating demand. Therefore, an increase of the thermal inertia facilitates energy conservation. During the cooling season low cost electricity or natural cooling can be used at night to store cooling using the high thermal inertia and reducing the cooling demand of the following cooling period. Also thermal inertia reduces inside temperature variations improving comfort for the occupants. The PCM can be used to cover the inside surface of walls and ceilings (gypsum wallboard, ceiling tiles, among others) to provide other advantages such as a large surface area for heat transfer between the PCM and the inside air, a close contact between the storage medium and the air to cool or heat, a uniform air temperature because air is surrounded by the storage medium, storage is added without utilization of useful volume, and there is no additional cost for storage medium installation during construction. The storage medium is invisible to users and does not require any control device (passive temperature regulation).

In another aspect, an appliance includes a memory storage location storing a flag indicative of a predicted demand-response (DR) period such as from a utility or when a current alternating current (AC) duty cycle differs from a specified AC duty cycle by a predetermined variance. The appliance includes a controller coupled to the flag to autonomously place the appliance in an energy shedding mode during the predicted DR period.

Implementation of the above system may include one or more of the following. The predicted DR period occurs when the specified duty cycle comprises 60 hertz and the current AC power duty cycle comprises about 59.5 hertz or less. The appliance can include a wide area network coupled to the sensor; a server coupled to the wide area network, wherein for each appliance the server stores a location, a user preference, and appliance properties, and wherein the server receives periodic operating state update and time stamp from each appliance. The controller can determine the location of the appliance using an internet protocol (IP) address. The controller indicates the location of the appliance using an address selected from one of a user entered address, an address stored in another appliance, and an address determined by a positioning system. The server determines a first group of appliances in an uninterruptible phase and sends a DR override instruction to the controller(s) in the first group. The server modulates operations of appliances to avoid stressing the electrical grid. The appliance can include a sensor that compares the current AC duty cycle against the specified AC duty cycle and sets the flag indicative of a predicted demand-response (DR) period. An external power sensor can be placed external to the appliance, wherein the power sensor compares the current AC duty cycle against the specified AC duty cycle and sets the flag indicative of a predicted demand-response (DR) period.

In one implementation, the appliance can be a refrigerator with an ice energy storage chamber providing a predetermined cold energy for a refrigerated volume for the predicted DR period; and a fan to circulate cold air from the ice energy storage chamber inside the refrigerated volume during the predicted DR period. The refrigerator can include a phase change material coupled to the refrigerated volume to maintain the refrigerated volume at a predetermined temperature during the predicted DR period. The controller modulates compressor operation to reduce power consumption during the predicted DR period. The controller precharges the refrigerator prior to the predicted DR period. The controller precharges the refrigerator based on weather or warning from an authority. The refrigerator can include ice storage to store coolth when power is available and used during the DR period. The fact that water is a pure substance and that making ice does not involve a chemical reaction is one reason that ice storage is a relatively trouble free system.

In another implementation, the appliance is a water heater with a back-up heated energy storage chamber to store a reserve heated water to maintained a predetermined temperature output for the water heater during the predicted DR period; and a valve to mix the reserve heated water with the water in the main water heater tank during the predicted DR period. The water heater can include a phase change material coupled to the water volume to maintain the water at a predetermined temperature during the predicted DR period. The water heater controller modulates heater operation to reduce power consumption during the predicted DR period. The controller can precharge the water heater prior to the predicted DR period or based on weather or warning from an authority.

In another implementation, the appliance can be a washer with a digitally actuated latch to secure a washer door during the predicted DR period. If the washer is in an uninterruptible cleaning operation during the predicted DR period, the controller reduces power consumption during the predicted DR period and subsequently repeats the uninterruptible operation after the predicted DR period. Further, if the washer is in an extendible cleaning operation during the predicted DR period, the controller reduces power consumption during the predicted DR period and subsequently completes the extendible operation after the predicted DR period. The washer appliance can include a back-up heated energy storage chamber to store a reserve heated water to maintained a predetermined temperature output for the heater during the predicted DR period; and a mixer to mix the reserve heated water with cold water to maintain a predetermined washing temperature during the predicted DR period. A data input device can indicate the use of detergent additive or bleach usage, wherein the processor ignores the predicted DR period to avoid damage to items in the washer.

BRIEF DESCRIPTION OF THE FIGURES

FIGS. 1A and 1B show an exemplary smart grid home.

DESCRIPTION

Figure 1A:
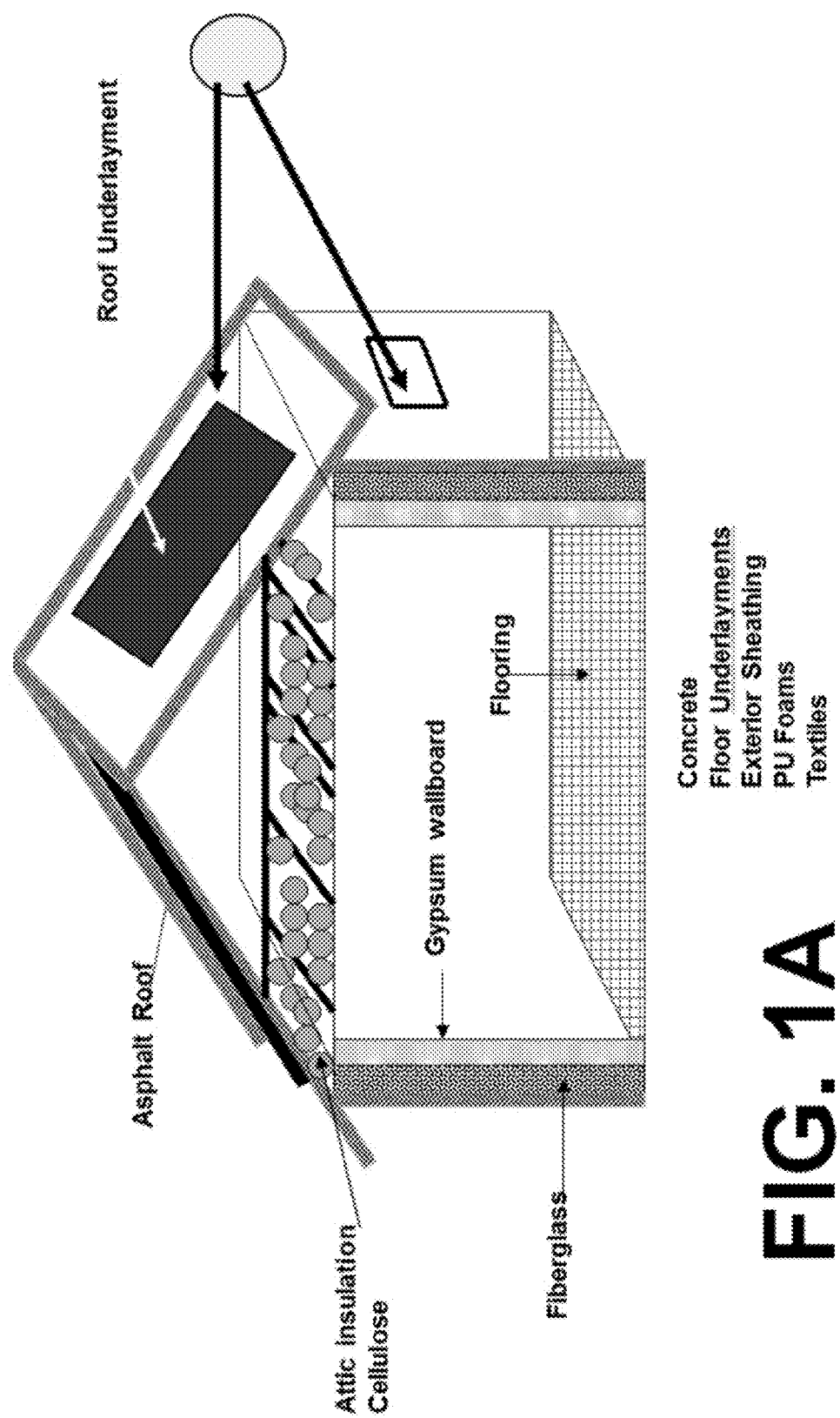

FIG. 1A shows an exemplary smart grid home. The smart grid home includes smart building materials such as smart tile ceiling/floor panels and windows/window shades, as discussed in depth below. In one embodiment, the home may include a roof refrigeration unit to store energy. Ice is one technical modality currently used in commercial building applications to store "coolth" at night by running refrigeration equipment. During the day, the refrigeration equipment is turned off to reduce peak electrical demand. To store heat (from the sun, for example), however, a different phase change material is needed. Alternatives to ice can be used. For example, paraffin, alone, and solid-state phase change materials (PCM) can be incorporated into building products such as wallboard and concrete. Microencapsulated PCM can be used in window cover or fabrics to reduce temperature fluctuations.

The windows allow sunlight or solar radiation into a building or structure when the ambient temperature is low and substantially block solar radiation when the ambient temperature is high, especially when sunlight is directly on the window. This house provides windows that allow passive solar heating and daylighting on colder days and still provide significant daylighting, while blocking solar heat build-up on warmer days, especially from sunlight shining directly on or through the windows of this invention. This house also provides thermochromic devices such as variable transmission shutters for use as lenses or filters.

Ultimately, it is the outdoor or ambient temperature and the directness of the sun's rays that determine the need for energy blocking character of windows. In a number of embodiments of this invention, the windows of this invention spontaneously change to provide energy blocking under the appropriate conditions of temperature and directness of sunlight without the control mechanisms and user intervention required by most alternate technologies under consideration for use as dimmable windows. Other embodiments of this invention provide windows that can be controlled by users or be controlled automatically by, for example, electronic control mechanisms, if so desired.

Windows have residual light energy absorbing character such that when exposed to sunlight, (especially direct sunlight on warm or hot days), the temperature of at least a portion of the total window structure is raised significantly above the ambient, outdoor temperature. The windows and devices combine thermochromic character with this residual light energy absorbing character, juxtaposed in such a manner that there is an increase in temperature of the materials responsible for the thermochromic character when there is an increase in temperature due to sunlight exposure of the materials responsible for the residual light energy absorbing character. The thermochromic character is such that the total light energy absorbed by the window increases as the temperature of the materials responsible for the thermochromic character is increased from the ambient, outdoor temperature to temperatures above the ambient, outdoor temperature.

The residual light energy absorbing character is provided by static light energy absorbing materials and/or thermochromic materials that have some light energy absorbing character at ambient, outdoor temperatures. Preferably, any light energy absorbing character of the thermochromic materials at ambient outdoor, temperatures that contributes to the residual light energy absorbing character is due to the more colored form of the thermochromic materials that exists because of the thermal equilibrium between the less colored and more colored forms at outdoor, ambient temperatures or is due to the coloration of the less colored form and is not due to photochromic activity of the thermochromic materials. Preferably, the residual light energy absorbing character is such that the window is capable of absorbing about 5% or more and more preferably about 10% or more of the energy of solar irradiance incident on the window or device apart from any absorption changes caused by sunlight exposure. Preferably, the residual light energy absorbing character is such that there is a temperature increase in the materials responsible for the thermochromic character of at least 10° C. and more preferably of at least 20° C. above the ambient, outdoor temperature when the window or device is exposed to direct or full sunlight.

The thermochromic character can be provided by essentially any material or materials which change reversibly from absorbing less light energy to absorbing more light energy as the temperature of the material or materials is increased. It is preferred that the thermochromic character be provided by materials that have a smaller absorption at outdoor, ambient temperatures on warm and hot days and have an increase in absorption when the temperature of the materials responsible for the thermochromic character is increased at least 10° C. It is preferred that the thermochromic character be provided by materials that have even less absorption at outdoor, ambient temperatures on cool and cold days and a less significant increase in absorption when the temperature of the window increases due to exposure to direct or full sunlight on cool and cold days.

The windows optionally combine other characteristics like low emissivity, infrared light reflectance, barrier properties, protective overcoating, multipane construction and/or special gas fills to provide energy efficient windows.

Energy efficient windows and devices of the invention can have one or more thermochromic layers which change from absorbing less light energy to absorbing more light energy as the temperature of the thermochromic layer(s) is increased. For many of the thermochromic layers used in the invention, this means a change from less colored to more colored as the temperature of the thermochromic layer(s) is increased.

Windows and devices of the invention can have one or more substrates, (i.e. window pane, panel, light or sheet). The substrate may be a thermochromic layer or the substrate may have thermochromic layer(s) provided thereon. Windows of the invention may comprise two or more substrates spaced apart by spaces containing gas or vacuum.

Windows optionally include a barrier to short wavelength light. The short wavelength light may be ultraviolet (UV) light. The short wavelength light may, optionally, include short wavelength visible (SWV) light. The barrier may absorb some or all of the UV and/or SWV light incident on the barrier layer. The barrier may be a substrate, a portion of a substrate, (e.g., the barrier may be in a polymeric layer adhering two sheets of glass together), or the barrier may be a layer provided on a substrate. The barrier, if present, is located between the sun and the thermochromic layer and serves to protect and/or modify the behavior of the thermochromic layer and possibly other layers present. The barrier can protect other layers, for example, from photo-degradation by UV light and can modify the behavior of the thermochromic layer by suppressing some or all of the photochromic character of materials present which have both thermochromic and photochromic character. In many cases, the thermochromic materials will be incorporated into a polymeric material which includes an additive such as a UV stabilizer. While this stabilizer does not ordinarily provide the equivalent effect of a barrier layer, devices have been constructed without a barrier layer when a UV stabilizer is present in the thermochromic layer.

Windows may have a protective overcoat. This overcoat, if present, serves to protect the thermochromic layer and optionally any other layer which may be present from, for example, physical abrasion, oxygen and environmental contaminants. The thermochromic layer is located between the sun and the protective overcoat, if it is present, e.g., a window pane of glass/thermochromic layer/protective overcoat may be oriented with the overcoat on the inside surface of the window structure.

Windows may also have one or more static light energy absorbing materials. These materials provide relatively constant light energy absorption, (i.e. absorption which is not significantly dependent on the temperature or photochemical processes of the light energy absorbing material). The static light energy absorbing material(s), if present, serves to provide residual light energy absorbing character and thus absorbs enough light energy during direct or full sunlight exposure to raise the temperature of at least a portion of the window above the ambient temperature surrounding the window. This helps to make the windows responsive to the directness of the sunlight. The static light energy absorbing materials may be contained in a separate layer, in the substrate, and/or any of the other layers present including the thermochromic layer as long as the absorbed energy is able to warm the themochromic material to a temperature at which the thermochromic material increases in sunlight absorption.

Windows may have one or more low emissivity, (low-e), layers. The low-e layer(s) helps provide energy efficiency by its ability to reflect infrared, (IR), light and/or its ability to poorly emit or radiate IR light.

Using the thermochromic layers, the roof can turn white during summer days to reflect sunlight and minimize heat inside the house and can turn black during winter months to absorb heat to warm the house.

The carpet can also have a multi-component PCM fibre, wherein a first fibre body consists of a first material comprising a phase change material and a second fibre body consists of a second material and encloses the first fibre body, wherein the phase change material is in raw form and the first material comprises a viscosity modifier selected from polyolefines having a density in the range of 890-970 kg/m 3 as measured at room temperature according to ISO 1183-2 and a melt flow rate in the range 0.1-60 g/10 minutes measured at 190° C. with 21.6 kg weight according to ISO 1133.

The expression "raw form" is intended to mean that the PCM is introduced in its raw form at the manufacturing of the multi-component fibre, i.e. that the PCM is not encapsulated, the PCM is neither carried on or by another material solid at the spinneret temperature during spinning of the multi-component fibre, such as soaked into a porous structure, wherein the structure is solid at the spinneret temperature during spinning of the multi-component fibre. Thus, the PCM is considered as in "raw form" in spite of it being mixed with the viscosity modifier at manufacturing the multi-component fibre.

Polymers having a melt flow rate in the range 0.1 to 60 g/10 minutes measured at 190° C. with 21.6 kg weight are suitable as viscosity modifiers in the multi-component fibre. Many of the efficient PCM materials are low molecular compounds and such compounds possess low viscosities at the relevant processing temperatures (180-300° C.). In order to make multi-component fibres with a sheath material, the second material, having a higher viscosity at the processing temperature, the inventors have now found that if the phase change material is mixed with a polyolefin having a melt flow rate in the range 0.1-60 g/10 minutes, a fibre having high latent heat and which is strong is obtained. The polyolefin is a viscosity modifier, which increases the viscosity of the first material of the multi-component fibre.

A low amount of a viscosity modifier having a melt flow rate in the range 0.1-60 g/10 minutes may be used, which is an advantage for the thermal efficiency in terms of specific latent heat and at the same time allow the full utilisation of the inherent specific latent heat of melting/crystallisation of the phase change material. If a higher value than 60 g/10 minutes is used, the viscosity will be too low and the mixture will not be possible to process a fibre. The mixture will be "watery", i.e. very thin. A value lower than 0.1 g/10 minutes of the viscosity modifier might lead to curling of the fibres and fibre spinning may not be possible.

As shown in FIG. 1B, apparatus 101 includes a unit 103 comprising a controller 104 and an internal storage device 105. Internal storage device 105 may comprise, for example, a plurality of lead-acid or nickel-metal-hydride storage batteries for storing electrical energy, and/or large capacitors. External storage device 106 may be optionally included to store additional electrical energy. As explained in more detail herein, storage devices 105 and 106 may provide power to various devices during times of electrical grid outages or during periods where electrical grid costs exceed certain thresholds, and they may be used to sell power back to the electrical utility during times that are determined to be favorable. The storage capacities of devices 105 and 106 may be selected to suit a particular environment, such as the needs of a typical home residence, business, or other electrical consumer.

Storage in the form of compressed air is usually discounted due to the poor thermodynamic efficiency, but the capital cost is low and in some cases the marginal value of solar power is zero (when supply exceeds demand the excess cannot be sold or stored by other means), so compressed air storage may be practical in some embodiments of the invention. Finally, in some specific locations it may be possible to store power by pumping water to an elevated water tower or reservoir (pumped storage) which could increase storage capacity by another factor of 10. Power electronics, including inverters for converting DC electrical energy into AC energy, circuit breakers, phase converters and the like, may also be included but are not separately shown in FIG. 1.

Controller 104 may comprise a computer and memory programmed with computer software for controlling the operation of apparatus 101 in order to receive electrical power from power sources 109 through 115 and to distribute electrical power to devices 116 through 122. Further details of various steps that may be carried out by such software are described in more detail herein.

As the building may contain non-electrical energy storage materials embedded in a building, the controller precharges the materials embedded in at least a ceiling, a floor, window, wallboard, or concrete of a building in advance of an expected DR period. In one embodiment, the controller creates in advance computer models of the non-electrical energy storage materials or sources and uses the models to precharge the non-electrical energy storage material or the non-electrical energy source in advance of an expected DR period. The computer model can be statistical or non-statistical. For example, Hidden Markov Models (HMMs) can be used to model building energy behavior and such models can be used to precharge the building thermal envelopes.

The ability to pre-charge the building supports utility DR programs, since off-peak power such as night time can be used to store energy in the non-electrical energy storage materials and non-electrical energy storage sources of energy and such energy can be used to supplement the reduced power during the DR period.

Controller 104 and internal storage device 105 may be housed in a unit 103 such as a metal rack having appropriate cabling and support structures. Apparatus 101 also includes a user interface 102 for controlling the operation of unit 103. The user interface may comprise a keypad and CRT, LED or LCD display panel or vacuum fluorescent type; a computer display and keyboard; or any other similar interface. The user interface may be used to select various modes of operation; to display information regarding the operation of the apparatus; and for programming the apparatus.

An optional control center 108 may be provided to transmit commands to apparatus 101 through a network, such as WAN 107 (e.g., the Internet). Control center 108 may be located at a remote location, such as a central control facility, that transmits commands to a plurality of units 101 located in different homes or businesses. In addition to transmitting commands, control center 108 may transmit pricing information (e.g., current price of electricity) so that controller 104 may make decisions regarding the control and distribution of electricity according to various principles of the invention.

Apparatus 101 is coupled to the electric utility grid 115 through a power interface (not shown), which may include circuit breakers, surge suppressors and other electrical devices. Electricity may be supplied in various forms, such as 110 volts or 240 volts commonly found in homes. A backup generator 114 may also be provided and be controlled by apparatus 101 when needed. One or more alternative energy sources 109 through 113 may also be provided in order to provide electrical power to the apparatus. Such sources may include photovoltaic (PV) cells 109, which may be mounted on a roof of the home or business; microhydroelectric power generators 110, which generate power based on the movement of water; gas turbines 111; windmills or other wind-based devices 112; and fuel cells 113. Other sources may of course be provided.

During normal operation, power from one or more of the power sources can be used to charge storage units 105 and 106 and/or to meet demand in addition to electric grid 115. During power outages or brownouts from grid 115, these additional power sources (as well as storage units 105 and 106) can be used to meet energy demand. Additionally, surplus power can be sold back to the power grid based on optimization of supply and demand calculations as explained in more detail herein.

The bold lines shown in FIG. 1 indicate electrical distribution paths. Control paths to and from the various devices are not separately shown but are implied in FIG. 1.

One or more power-consuming devices 116 through 122 may also be controlled by and receive power from apparatus 101. These include one or more sensors 116 (e.g., thermostats, occupancy sensors, humidity gauges and the like); heating/ventilation/air-conditioning units 117; hot water heaters 118; window shades 119; windows 120 (e.g., open/close and/or tint controls); and one or more appliances 121 (e.g., washing machines; dryers; dishwashers; refrigerators; etc.). Some appliances may be so-called "smart" appliances that can receive control signals directly from apparatus 101. Other conventional appliances can be controlled using one or more controllable relays 122. It is not necessary in all embodiments that apparatus 101 directly provide electricity to devices 116 through 112. For example, apparatus 101 could be tied into the electrical power system in a home or business and electricity would be supplied through that path to the devices. Appropriate cut-off devices and bypass switches would then be used, for example, in the event of a power outage to disconnect the home wiring system from the electrical grid and to connect apparatus 101 to the wiring network. Such schemes are conventional and no further details are necessary to understand their operation.

The next several figures show exemplary DR responsive appliances including an exemplary water heater, an exemplary refrigerator, an exemplary dish washer, an exemplary clothes washer, and an exemplary oven.

Figure 2A:
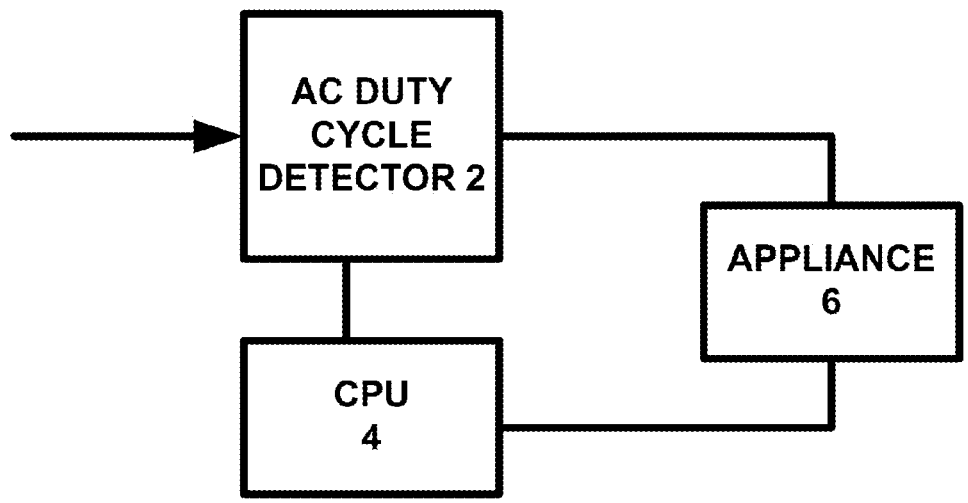
FIG. 2A and FIG. 2B show exemplary DR responsive appliances such as an exemplary water heater, an exemplary refrigerator, an exemplary dish washer, an exemplary clothes washer, and an exemplary oven.

FIG. 2A shows an exemplary appliance 6 with a processor 4 and embedded memory storage location storing a flag indicative of a predicted demand-response (DR) period when a current alternating current (AC) duty cycle differs from a specified AC duty cycle by a predetermined variance. This is detected by AC duty cycle detector 2. The processor or controller 4 is connected to the detector or sensor 2 to autonomously place the appliance in an energy shedding mode during the predicted DR period without receiving an explicit load shedding command from a utility or a power generator.

In one embodiment, the predicted DR period occurs when the specified duty cycle comprises 60 hertz and the current AC power duty cycle comprises about 59.5 hertz or less. The appliance can include a wide area network coupled to the sensor; a server coupled to the wide area network, wherein for each appliance the server stores a location, a user preference, and appliance properties, and wherein the server receives periodic operating state update and time stamp from each appliance. The controller can determine the location of the appliance using an internet protocol (IP) address. The controller indicates the location of the appliance using an address selected from one of a user entered address, an address stored in another appliance, and an address determined by a positioning system. The server determines a first group of appliances in an uninterruptible phase and sends a DR override instruction to the controller(s) in the first group. The server modulates operations of appliances to avoid stressing the electrical grid. The appliance can include a sensor that compares the current AC duty cycle against the specified AC duty cycle and sets the flag indicative of a predicted demand-response (DR) period. An external power sensor can be placed external to the appliance, wherein the power sensor compares the current AC duty cycle against the specified AC duty cycle and sets the flag indicative of a predicted demand-response (DR) period.

Preferably, the control system of each appliance is done with digital signal controllers with smaller, quieter motors with energy efficiency as high as 85%-90%. A high efficiency is necessary to receive a stamp of approval from a governing body such as the US Environmental Protection Agency and Department of Energy ENERGY STAR rating. The appliances also comply with IEC 60730 specification covering mechanical, electrical, electronic, EMC, and abnormal operation of AC appliances. For microcontrollers, the specification details new test and diagnostic methods for the real-time embedded software to ensure the safe operation of embedded control hardware and software. For larger, higher-performance products where reliability and motor-control accuracy are key concerns, isolation products block high voltage, isolate grounds, and prevent noise currents from entering the local ground and interfering with or damaging sensitive circuitry. The digital signal controllers perform digital motor control, Power Factor Correction, and other system functions. A home mesh network consisting of home appliances, audio/video equipment, HVAC system, lighting fixtures, etc connected wirelessly and controlled via a remote control over ZigBee™ network. Thus, appliances can communicate with each other by creating intelligent home networks such that, for example, a wash load is completed and a message be displayed on your TV, or LCD display on your refrigerator or remote control. With low-power wireless solutions, home owners will benefit from a universal remote control that: does not require line-of-sight; has an increased range such that one can remotely control any ZigBee device from anywhere in the home; allows for two-way communication.

In one embodiment, refrigerator is equipped with RFID and allows customers to keep an up-to-date inventory of their refrigerated goods and have this information displayed on a video display that may reside on the refrigerator door. Once RFID tags on individual household goods become commonplace in the market, RFID-equipped refrigerators will be able to automatically identify the item as it is being taken in and out of the unit. This will happen once the large chain food retailers themselves use RFID as their main mechanism for receiving payment at the checkout counter.

Figure 2B:
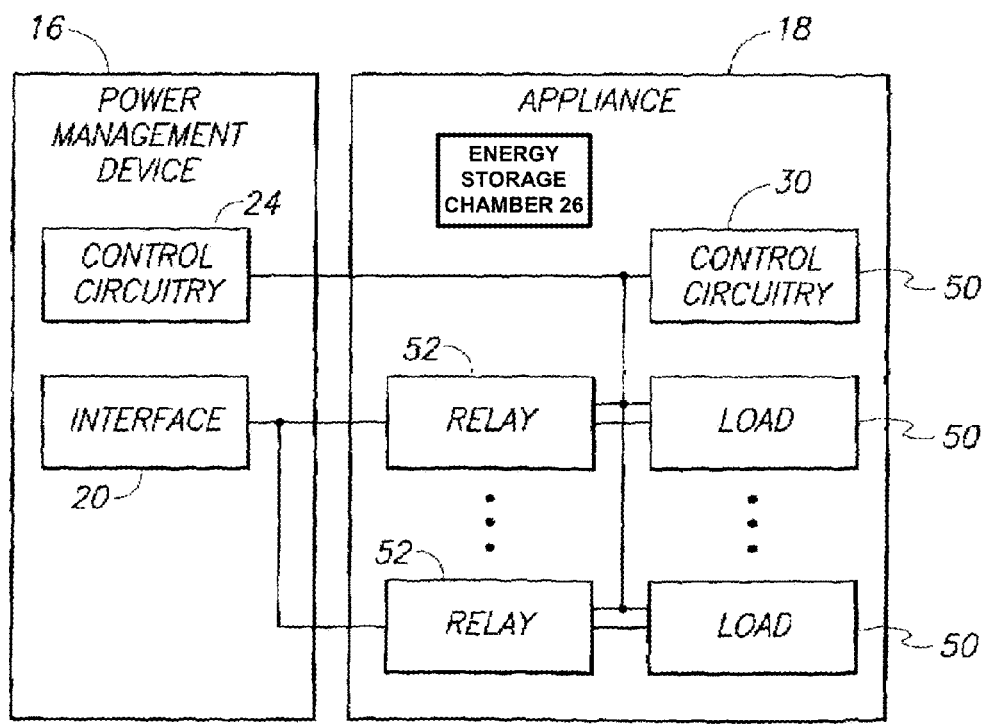

Referring to FIG. 2B, additional details regarding power management device 16 and appliance 18 according to one possible embodiment are presented. The power management device 16 and associated appliance 18 may be referred to as an electrical energy consumption system.

The depicted power management device 16 includes an interface 20 and control circuitry 24. Interface 20 is arranged to receive operational electrical energy for consumption using the respective appliance 18. Interface 20 may be referred to as a power interface and comprise the node described above. Interface 20 may be implemented using a wall outlet adapter able to receive supplied residential, commercial, industrial, or other electrical energy in exemplary configurations. Control circuitry 24 may be embodied as a microprocessor or other appropriate control architecture.

The depicted exemplary appliance 18 comprises control circuitry 30, a plurality of associated loads 50, and a plurality of relays 52. Control circuitry 30 may be implemented as a microprocessor or other appropriate control architecture and may also comprise an associated load 50. Associated loads 50 consume electrical energy. Relays 52 selectively supply electrical energy power from grid 14 to respective loads 50. In other configurations, a single relay 52 may supply electrical energy to a plurality of loads 50 of a given appliance 18. Other configurations for controlling the application of electrical energy from interface 20 to load(s) 50 are possible.

Power management device 16 may be configured according to the exemplary device arrangements described in the incorporated patent application. Power management device 16 is arranged in one embodiment as a discrete device separate from the appliance 18 as mentioned above. Alternately, power management device 16 may be implemented entirely or partially using existing components of the appliance 18. For example, functionality of control circuitry 24 may be implemented using control circuitry 30 to monitor electrical energy of power distribution system 10 and to control consumption of electrical energy by one or more of loads 50 responsive to the monitoring. As described in the incorporated patent application, a relay (or other switching device not shown in FIG. 2) internal of device 16 may be used to adjust the amount of electrical energy consumed by appliance 18. Control circuitry 24 and/or control circuitry 30 may be arranged to control the operations of the associated relay (not shown) of device 16. As shown, appliance 18 may comprise associated relays 52 which may be controlled by control circuitry 24 and/or control circuitry 30. Switching device configurations other than the described relays may be used.

In other arrangements, control circuitry 24 may provide control signals to control circuitry 30 or directly to loads 50 to control the rate of consumption of electrical energy by loads 50 without the use of relays 52 (accordingly relays 52 may be omitted). Responsive to the received control signals, control circuitry 30 may operate to control respective loads 50, or loads 50 may internally adjust rates of consumption of the electrical energy responsive to directly receiving the control signals from circuitry 24 or 30.

According to the specific arrangement of the appliance 18 being controlled, aspects described herein, including monitoring of electrical energy of system 10 and/or controlling the consumption of power within appliance 18, may be implemented using circuitry internal and/or external of the appliance 18. The discussion herein proceeds with respect to exemplary configurations wherein monitoring and control operations are implemented by control circuitry 30. Any alternate configurations may be used to implement functions and operations described herein.

Appliances 18 comprise devices configured to consume electrical energy. Exemplary appliances 18 described below include temperature maintenance systems, HVAC systems, clothes dryers, clothes washers, water management systems (e.g., spa and/or pool), dish washers, personal computer systems, water heaters, and refrigerators. The described appliances 18 are exemplary for discussion purposes and other arrangements are possible.

As shown in the exemplary arrangement of FIG. 2, appliances 18 may individually comprise a plurality of different associated loads 50 individually configured to consume electrical energy. For example, for a given appliance 18, one of loads 50 may be a control load wherein processing is implemented (e.g., 3-5 Volt circuitry of control circuitry 30) and another of the loads 50 may be a higher voltage load including exemplary motors, heating coils, etc. The controller of FIG. 2B can charge an energy reservoir 26 to provide energy during the DR period. The reservoir 26 can be ice energy for powering a refrigerator, or hot water to back up a washer or water heater, for example.

Consumption of electrical energy by such appliances 18 may be adjusted by turning off (or otherwise adjusting the operation of one associated load 50 while leaving another associated load 50 powered (or otherwise unaffected). During exemplary power management operations, it may be desired adjust an amount of electrical energy applied to one of the associated loads 50 of a given appliance 18 (e.g., a high power associated load) while continuing to provide full (or otherwise unadjusted) amount of electrical energy to another of the associated loads 50 of the given appliance 18 (e.g., a low power associated load). Alternately, power may be adjusted, reduced or ceased for all associated loads all together.

Adjustment of the consumption of electrical energy by an appliance 18 may be implemented responsive to monitoring by appropriate control circuitry of electrical energy of power distribution system 10. In one embodiment, a characteristic (e.g., system frequency) of the electrical energy is monitored. The incorporated patent application provides exemplary monitoring operations of system frequency (e.g., voltage) of electrical energy supplied by power distribution system 10. Other characteristics of electrical energy of system 10 may be monitored in other constructions.

Responsive to the monitoring, appropriate control circuitry is configured to adjust an amount of consumption of electrical energy within at least one of the loads 50 from an initial level of consumption to another different level of consumption. For example, as described in the incorporated application, if the system frequency of the electrical energy deviates a sufficient degree from a nominal frequency, a threshold is triggered. As described in the incorporated application, the threshold may be varied at different moments in time (e.g., responsive to power-up operations of appliance 18 at different moments in time). In one embodiment, the varying of the threshold is random.

Appropriate control circuitry may adjust an amount of consumption of electrical energy (e.g., via one of loads 50)

from an initial level to another different level (e.g., reduced consumption mode) responsive to the threshold being triggered. Thereafter, the control circuitry continues to monitor the electrical energy. If the frequency returns to a desired range, the control circuitry may return the operation of the appliance 18 and load(s) 50 to a normal mode of operation (e.g., a mode wherein an increased amount of electrical energy is consumed). As described in the incorporated patent application, a variable length of time may be used to return the consumption to the initial level and the variable length of time may be randomly generated in at least one embodiment.

Accordingly, the appropriate control circuitry may control operation of the adjusted load 50 for a period of time at the adjusted level of electrical energy consumption. During the adjustment, the control circuitry may maintain the level of consumption of another load 50 of the appliance 18 at a normal level of consumption.

Some arrangements of power management device 16 permit override functionality. For example, the appropriate control circuitry may have associated user interface circuitry (not shown) usable by a user to disable power management operations via an override indication (e.g., hit a key of the user interface circuitry). Responsive to the reception of the override indication, the control circuitry may return the mode of operation of the affected load 50 to a normal consumption mode (e.g., wherein an increased amount of electrical energy is consumed compared with the level of consumption initiated during the power management operations).

Figure 3:
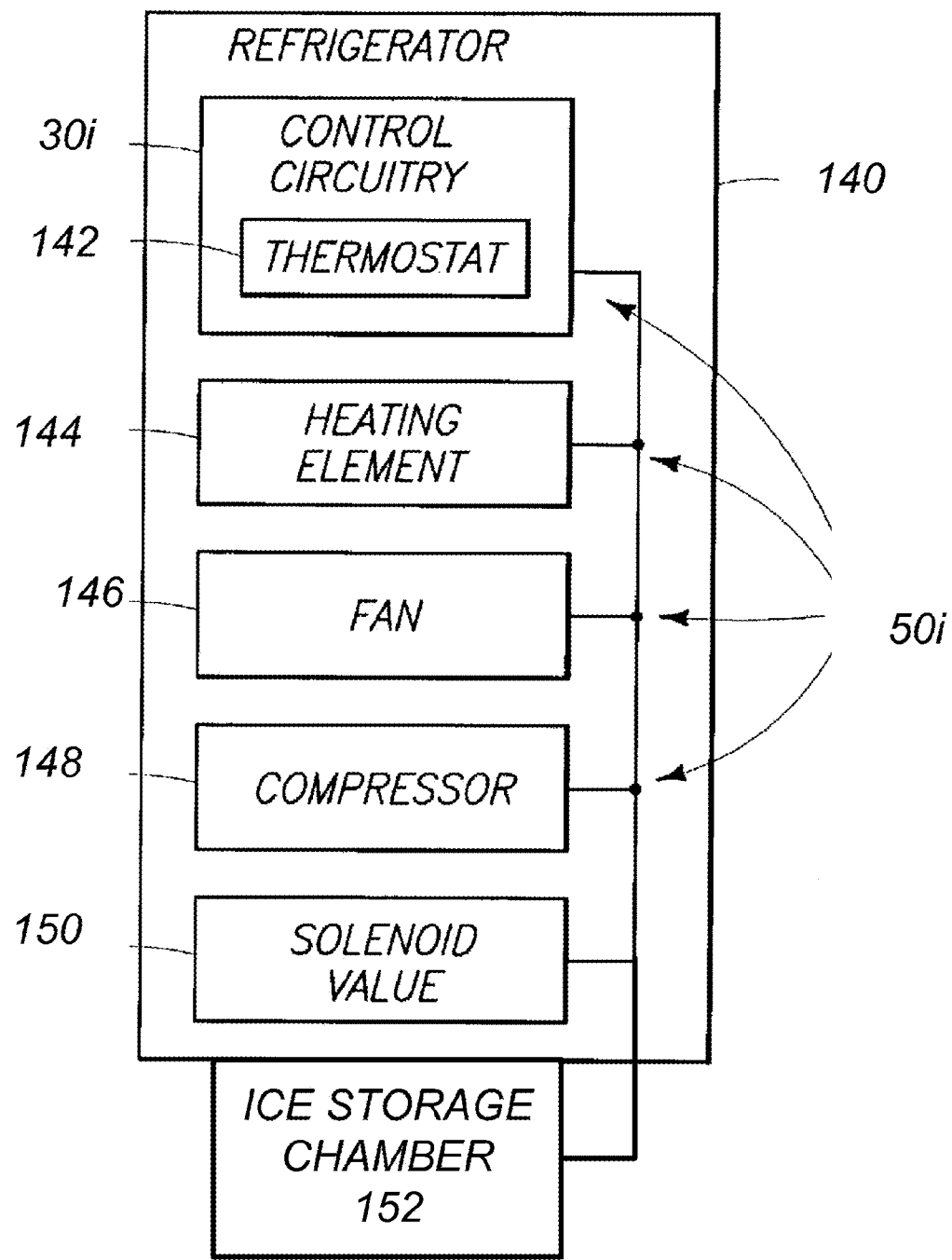
FIG. 3 shows an exemplary refrigerator.

FIG. 3 shows an exemplary refrigerator. The illustrated refrigerator 140 includes control circuitry 301 (embodying a thermostat 142), a heating element 144, a fan 146, a compressor 148, and a solenoid valve 150 in the depicted embodiment. Control circuitry 301, heater 144, fan 146, and compressor 148 comprise exemplary loads 501 in the depicted example. The refrigerator 140 also include an ice energy storage chamber 152. The embodiment uses ice storage to store coolth and used when the DR period is active.

First exemplary power management operations of control circuitry 301 include adjustment of a temperature set point of thermostat 142. It may be desired in at least one embodiment to set a relatively short duration of any temperature adjustment during power arrangement operations. Another possible power management operation provides temporary disablement of defrost operations of heating element 144 (e.g., coupled with unillustrated coils of refrigerator 140), or adjusting a time of the defrost operations controlled by control circuitry 30*i*. In another arrangement, heating element 144 may be used to provide anti-sweat operations (e.g., appropriately positioned adjacent an exterior portion of an unillustrated cabinet of refrigerator 140—for example adjacent to a door) and power management operations may include temporary disablement of the anti-sweat operations or otherwise adjusting such operations to occur at another moment in time wherein power management operations are not being implemented. Additional exemplary power management operations include disablement of interior air circulation operations implemented by fan 146 and/or controlling operations of compressor 148 (e.g., including temporarily disabling or reducing the speed of compressor 148). Additional aspects include implementing a hot gas bypass operation of compressor 148 using solenoid valve 150 and as described in further detail above in one example. One other embodiment provides a multi-stage refrigerator 140 having a plurality of cooling stages and a power management operation includes controlling the refrigerator 140 to operate at less than the available number of cooling stages thereby reducing the amount of energy consumed by the appliance.

In one implementation, the refrigerator ice energy storage chamber provides a predetermined cold energy for a refrigerated volume for the predicted DR period; and a fan to circulate cold air from the ice energy storage chamber inside the refrigerated volume during the predicted DR period. The refrigerator can include a phase change material coupled to the refrigerated volume to maintain the refrigerated volume at a predetermined temperature during the predicted DR period. The controller modulates compressor operation to reduce power consumption during the predicted DR period. The controller precharges the refrigerator prior to the predicted DR period. The controller precharges the refrigerator based on weather or warning from an authority. The refrigerator can include ice storage to store coolth when power is available and used during the DR period. The fact that water is a pure substance and that making ice does not involve a chemical reaction is one reason that ice storage is a relatively trouble free system.

Figure 4:
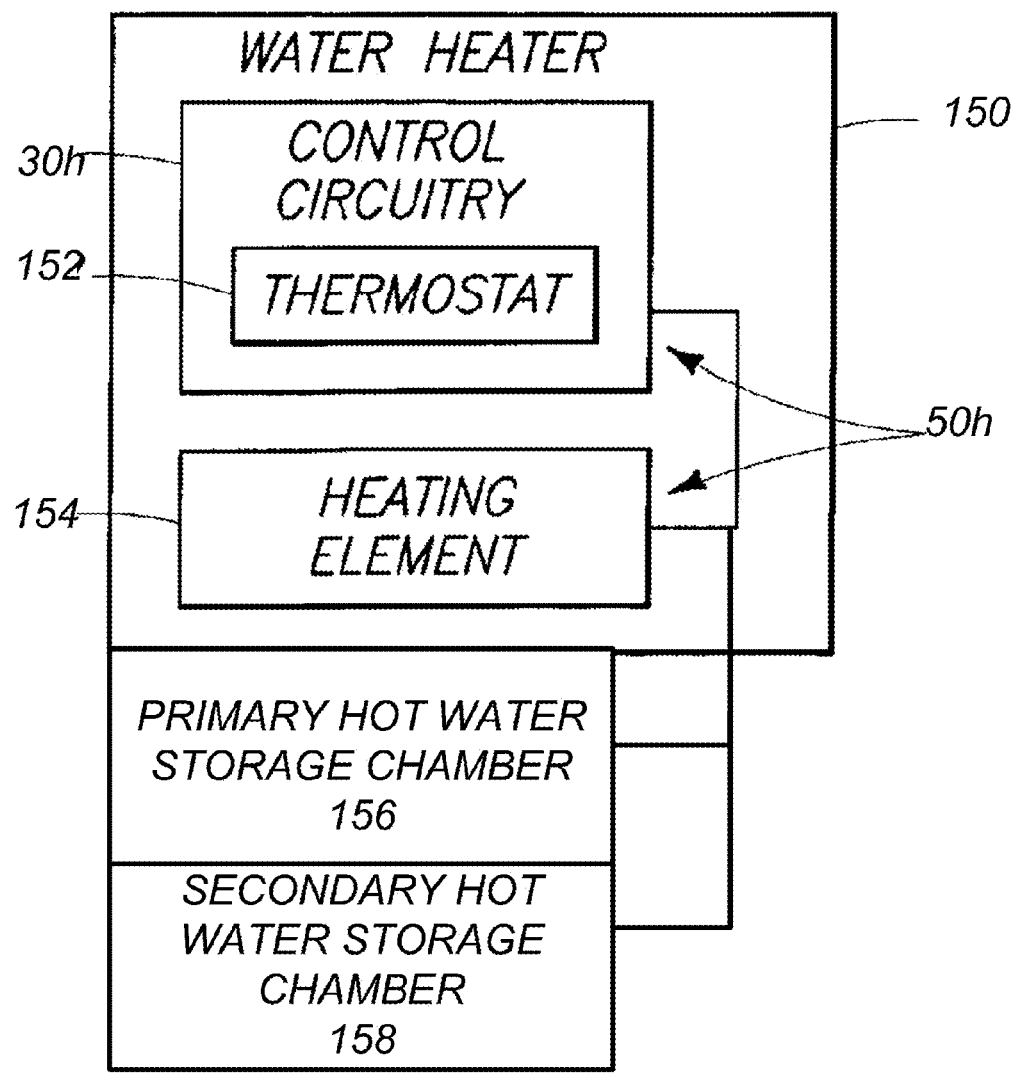
FIG. 4 shows an exemplary water heater.

FIG. 4 shows an exemplary water heater. Water heater 150 includes control circuitry 30 h (embodying a thermostat 152 in the illustrated configuration) and a heating element 154. Heating element 154 is configured to heat water in a main reservoir 156 and an associated reservoir 158 to a desired temperature in the depicted configuration. Control circuitry 30 *h* and heating element 154 comprise loads 50 *h* of water heater 150 in one embodiment.

According to an illustrative embodiment, power management operations of system 150 and implemented by control circuitry 30 *h* include adjusting a set point of thermostat 152. For example, the thermostat set point may be temporarily lowered (e.g., for a period of tens of seconds, or a few minutes in some examples). In other exemplary power management operations, control circuitry 30 *h* may directly disable or provide other control of heating element 154 and gate pre-heated water from the back up reservoir 158 during the DR period.

According to additional exemplary aspects, a set point of any of the thermostats disclosed herein of the various appliances may be assigned to one of a plurality of possible power management set points according to a monitored condition of electrical energy of system 101. For example, a scale of set points may be used according to the condition of the electrical energy (e.g., the temperature set point may be decreased at predefined decrements (1-10 degrees for example) corresponding to the system frequency of the electrical energy deviating respective predetermined amounts (e.g., 10 mHz) from the nominal frequency. In accordance with the described example, the magnitude of adjustment of the thermostat set point increases as the deviation of the system frequency from the nominal frequency increases.

In one implementation, the water heater 150 uses the back-up heated energy storage chamber 158 to store a reserve heated water to maintained a predetermined temperature output for the water heater during the predicted DR period; and a valve to mix the reserve heated water with the water in the main water heater tank during the predicted DR period. The water heater can include a phase change material coupled to the water volume to maintain the water at a predetermined temperature during the predicted DR period. The water heater controller modulates heater operation to reduce power consumption during the predicted DR period.

The controller can precharge the water heater prior to the predicted DR period or based on weather or warning from an authority.

Figure 5:
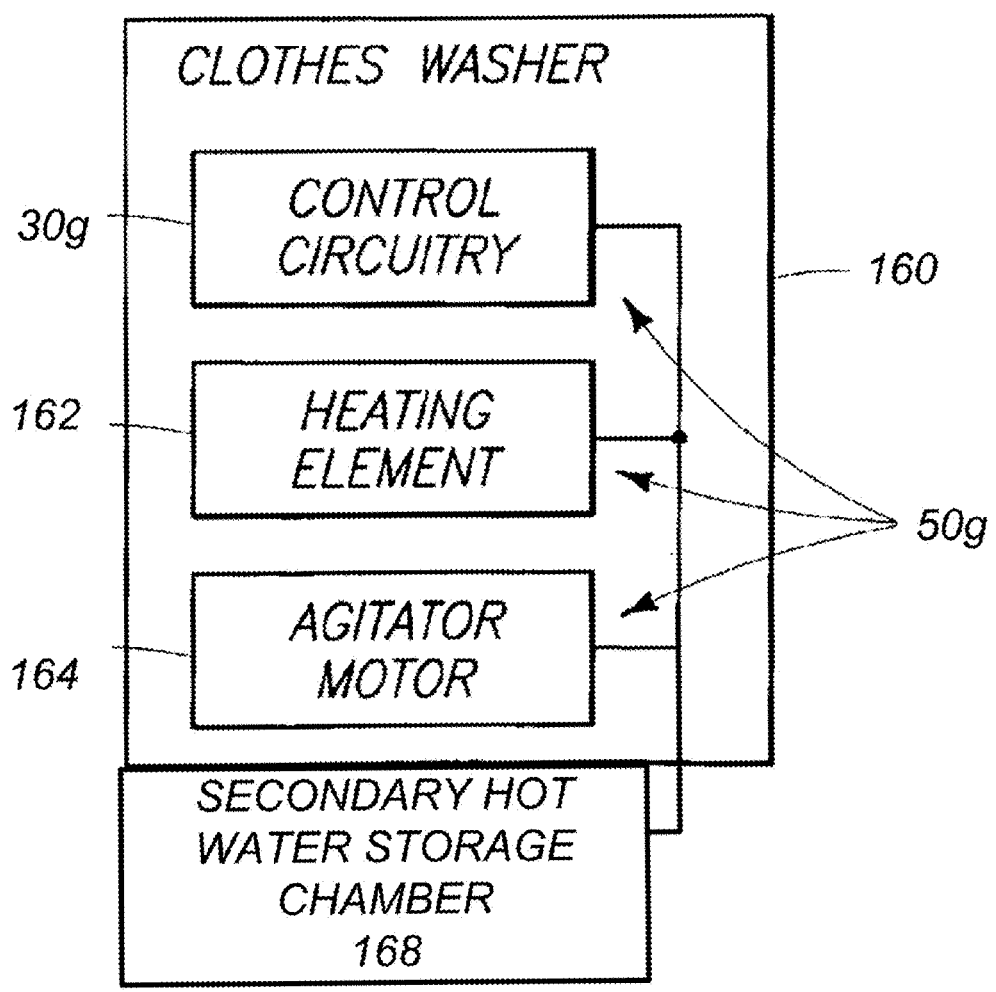
FIG. 5 shows an exemplary clothes washer.

FIG. 5 shows an exemplary clothes washer. In one implementation, the washer has a digitally actuated latch to secure a washer door during the predicted DR period. If the washer is in an uninterruptible cleaning operation during the predicted DR period, the controller reduces power consumption during the predicted DR period and subsequently repeats the uninterruptible operation after the predicted DR period. Further, if the washer is in an extendible cleaning operation during the predicted DR period, the controller reduces power consumption during the predicted DR period and subsequently completes the extendible operation after the predicted DR period. The washer appliance can include a back-up heated energy storage chamber to store a reserve heated water to maintained a predetermined temperature output for the heater during the predicted DR period; and a mixer to mix the reserve heated water with cold water to maintain a predetermined washing temperature during the predicted DR period. A data input device can indicate the use of detergent additive or bleach usage, wherein the processor ignores the predicted DR period to avoid damage to items in the washer.

Referring to FIG. 5, the exemplary clothes washer 160 may include control circuitry 30 $d$, a heating element 162, and an agitator motor 164. Heating element 162 is configured to heat water used in an associated compartment (not shown) of clothes washer 160 configured to receive and wash clothes. Heating element 162 is also used to heat a water reservoir 168 for use during the temporary DR period so that washing operations can continue. Agitator motor 164 is configured to oscillate between different rotational directions or otherwise agitate clothes within the associated compartment during wash and/or rinse operations. Control circuitry 30 $g$, heating element 162 and agitator motor 164 comprise associated loads 50 $g$ of clothes washer 160 in the depicted embodiment.

In one configuration, power management operations of clothes washer 160 include reducing or ceasing the supply of electrical energy to heating element 162 to reduce internal temperatures of water in the associated compartment and/or agitator motor 164 to reduce motion of the motor 164. The reduction in power by controlling heating element 162 may be linear and accordingly the benefits may be directly proportional to the reduction in the water temperature. The reduction in power to agitator motor 164 may be proportional to a product of angular acceleration, mass and angular velocity. A slowing down of agitator motion of motor 164 could affect both a reduction in acceleration as the motor reverses its motion as well as angular velocity. In other embodiments, it may be desired to maintain agitator motor 164 in an operative mode during an implementation of power management operations with respect to heating element 162.

An exemplary clothes dryer may similarly include control circuitry, a heating element, and a tumbler motor. Heating element is configured in one embodiment to heat an associated compartment (not shown) of clothes dryer configured to receive and dry clothes. Tumbler motor is configured to spin clothes within the associated compartment during drying operations. In one configuration, power management operations of clothes dryer include reducing or ceasing the supply of electrical energy to heating element (e.g., reducing an amount of current supplied to heating element) and/or tumbler motor. It may be desired to maintain tumbler motor in an operative mode during an implementation of power management operations with respect to heating element.

Figure 6:
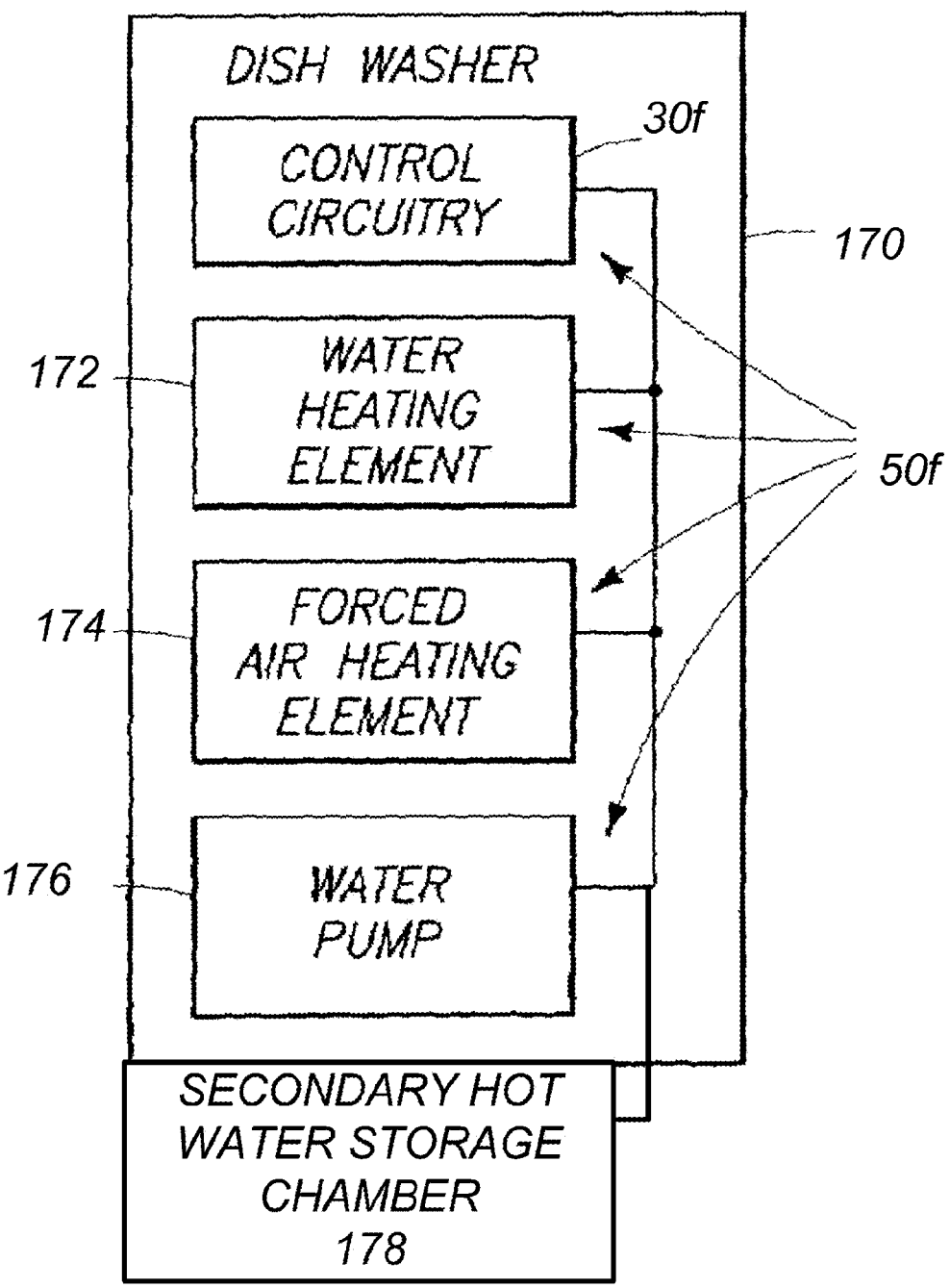
FIG. 6 shows an exemplary dish washer.

FIG. 6 shows an exemplary dish washer. Dish washer 170 includes control circuitry 30 $f$, a water heating element 172, a forced air heating element 174, and a water pump 176 in but one embodiment. Dish washer 170 may additionally include a compartment (not shown) configured to receive to dishes. Water heating element 172 may adjust a temperature of water used to wash dishes using dish washer 170 in one embodiment. Heating element 172 is also used to heat a reservoir 178 to provide hot washing water during a DR period. Forced air heating element 174 adjusts a temperature of air used to dry the dishes in one implementation. Water pump 176 may spray water on the dishes during a cleaning and/or rinsing cycle to provide a dish cleaning action and/or rinsing action. Control circuitry 30 $f$, heating elements 172, 174, and water pump 176 may comprise associated loads 50 $f$ of dish washer 170.

Exemplary power management operations of dish washer 170 implemented by control circuitry 30 $f$ in one embodiment include controlling the water heater 172 to reduce a water temperature boost cycle during wash operations and/or reduce air temperature by forced air heater 174 during rinsing/drying operations. Reduction of water temperature provides corresponding linear reductions in electrical power consumption. Control circuitry 30 $f$ may also control operations of water pump 176 (e.g., reduce the operational speed of pump 176) during modes of reduced power consumption.

Figure 7:
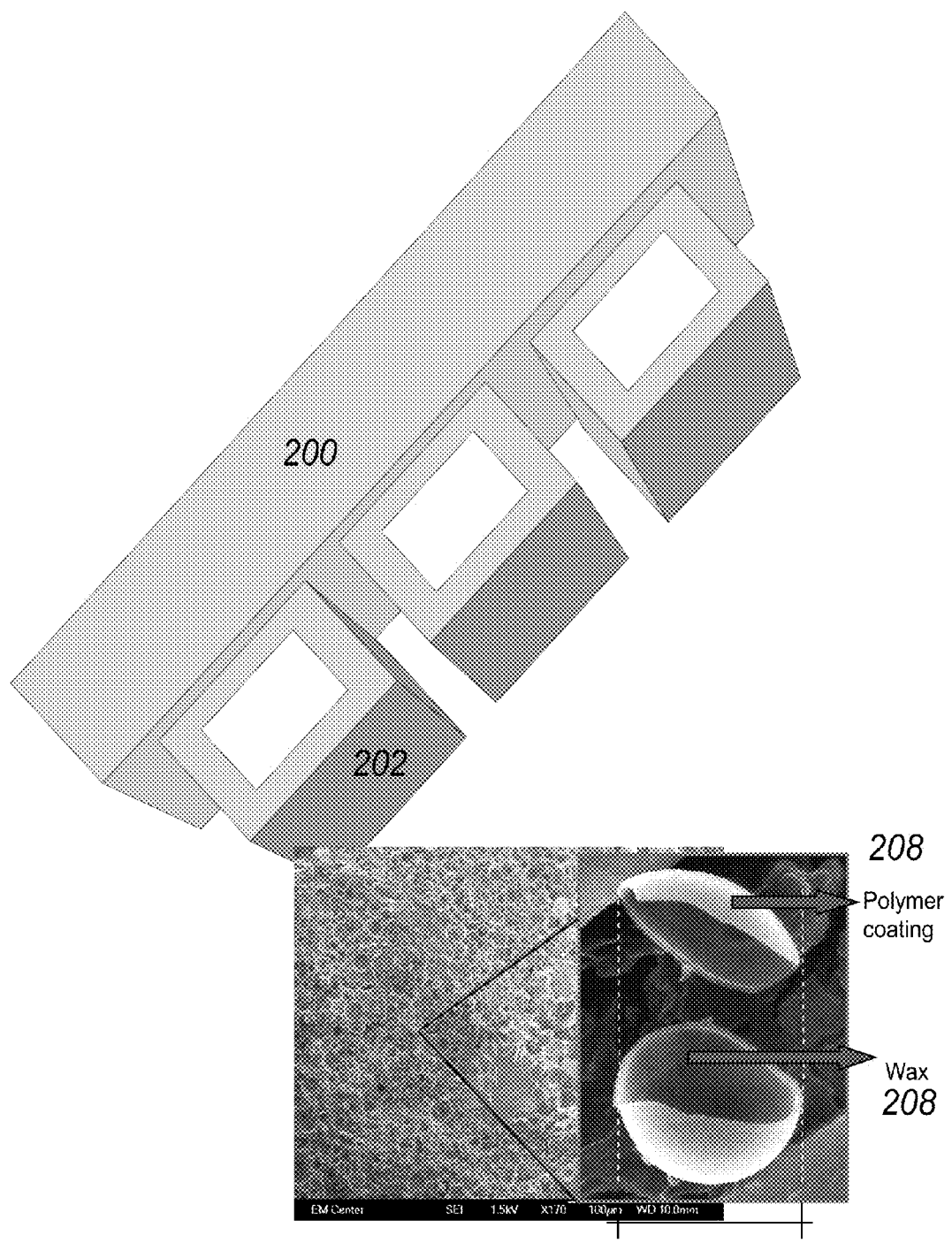
FIGS. 7-11 show exemplary phase change material (PCM) ceiling tiles or floor panels.

Turning now to FIG. 7, an exemplary ceiling tile 200 is shown with phase change materials on one or more air ventilation structures 202. The phase change material (PCM) contributes to the energy efficiency of buildings by reducing the peaks in the daily temperature cycles. As part of normal overnight ventilation, the warm air in the building is replaced by cold night-time air, which also reduces the temperature of the building's solid structures over the course of the night. PCM can increase the heat capacity of the building, meaning that additional 'coldness' can be stored in the building's structures. With our system, it may be possible that mechanical air conditioning is not needed at all; as a minimum, the energy consumption for air conditioning can be reduced. The structure 202 is hollow at the center to maximize air flow and thermal conductance between the PCM material and the air. The PCM structure has a plurality of microencapsulated PCM balls or capsules with wax or paraffin 208 inside of a polymer coating 208.

The phase change materials include alkanes, paraffin waxes and salt hydrates. These materials undergo a reversible solid to liquid phase change at various transition temperatures. 'Solid-state' phase change materials are those that change from amorphous to crystalline phases while remaining 'solid.' Both paraffin wax and salt hydrates typically require encapsulation to contain the liquid phase, which adds to final cost of this PCM. Salt hydrates are inorganic materials. Inorganic compounds have twice the volumetric latent energy storage compared to organic compounds. The organic compounds however, have the advantages of melting congruently and are non-corrosive. Salt hydrates will melt incongruently causing phase separation. There are two categories of solid-state phase change materials: layered perovskites and plastic crystals. The transition temperature of solid-state phase change materials in a pure form runs on the higher side for use in passive applications. By mixing these compounds in various ratios, the transition temperature can be lowered.

PCM can use paraffin waxes which are part of a family of saturated hydrocarbons. The structure is the type $C_n H$ 2n+2. Those with carbon atoms between five and fifteen are liquids at room temperatures and are not considered. Normal or straight chain and symmetrically branched chain paraffin waxes are the most stable. Typically, paraffin waxes with odd numbers of carbon atoms are more widely used because they are more available, more economical and have higher heats of fusion. Paraffin waxes are composed mainly of alkanes, approximately 75%. Alkanes and paraffin waxes are both organic compounds. Paraffin can contain several alkanes resulting in a melting range rather than a melting point. As the molecular weight increases, the melting point tends to increase as well. Using different mixtures of alkanes, specific transition temperatures for paraffin waxes can be attained. Paraffin waxes and alkanes at the transition temperature melt to a liquid and solidify upon cooling. They do not have the containment problems of salt hydrates. The properties of normal paraffin wax are very suitable for latent heat storage. They have a large heat of fusion per unit weight, they are non-corrosive, nontoxic, chemically inert and stable below 500° C. (932° F.). On melting, they have a low volume change and a low vapor pressure. Mixing different molecular weight paraffin waxes together can easily vary melting temperature. Since they are commercially available, the cost is reasonable. Prime candidates for passive applications are tetradecane, hexadecane, octadecane and eicosane. Paraffin wax has a low thermal conductivity. However, the addition of additives such as graphite could increase the thermal conductivity. A Boulder, Colo. company, Outlast Technology, distributes outerwear made of fabrics that incorporate encapsulated paraffin wax. The Outlast Technology fabric involves the microencapsulation of microscopic size droplets of paraffin wax. These encapsulated particles of wax are then incorporated into fabrics and foams that are used for lining materials.

Pure octadecane is very close to the defined ideal passive temperature. By mixing normal alkanes of different molecule weights, the melting or transition temperature can be altered from that of the pure form. The latent heat of a blend can be found from a linear equation, presented as:

Final Blend $J/g=$(wt. % $mPCM1 \times J/g$ $mPCM1$)+(Wt. % $mPCM2 \times J/g$ $mPCM2$)+...

Octadecane in its pure form has a relatively high heat of fusion with a transition temperature close to an ideal passive temperature. Its latent heat storage is more than three times greater than the NPG/PG mixture. Based on thermal storage capabilities, octadecane is the superior material, followed by the Kenwax 18.

Paraffin wax and solid-state phase change materials show the behavior of under or super cooling. This behavior occurs when the material does not solidify at the same temperature at which it melted. Solid-state phase change materials have shown more than a twenty-degree difference. The difference is not as noticeable in paraffin waxes. Other phase change materials can be used.

The PCM structure can be glued or secured to the tile. Preferably, the composite structure is less than 20% by mass of a binder material and the remaining mass is a phase change material (PCM).

The PCM ceiling tile concept is based on reducing peak air-conditioning loads in a space. To do this, the space is overcooled slightly during off peak hour, say to 68 F. Air returning through the ceiling plenum cools and solidifies the phase change material on the top of the ceiling tile. During the day the room thermostat is set to a higher temperature, say 75 F. The air passing through the plenum, entering the plenum at 75 F, is warmed further by light fixture ballasts in the ceiling. Without the PCM ceiling tile the air would return to the air handler at about 80 F and would be cooled there to about 55 F before being returned to the spaces to provide cooling. However, with the PCM present, the warm air will pass over the material and be cooled by the PCMs that are at 68-70 F. The PCM will liquefy as it absorbs energy from the air. By the time the air reaches the air handling unit it will have been cooled to about 70 F compared to the 80 F temperature it would have arrived at without PCM. On the one hand, the air has to be cooled from 80 to 55 F or 25 F, on the other the air only has to be cooled from 70 to 55 F or 15 F. In arid climates this represents a forty percent reduction in peak cooling load. However, in most other climates moisture is also removed at the air handler so a thirty percent (30%) reduction in peak load is possible.

The system of FIG. 7 reduces the rising cost of electricity/gas for cooling/heating a building. A derivative, but increasingly important, problem is environmental impact. Increasingly, architects and end users are taking electricity consumption explicitly into account, e.g. by penalizing inefficient products through the award (or non-award) of LEEDS points. The tile of FIG. 7 minimizes electricity consumption is (a) directly economically attractive to an end user, (b) attractive to a developer (who might incur higher upfront costs but can offer reduced energy consumption as a virtue to his lessors) and (c) attractive to architects/specifiers who are seeking energy efficiency.

The system performs automatic DR, reduces AC cost by 35% and shifts the demand peak by automatically releasing cooling energy during the day and warmth at night. Such systems provide a full range of options for both peaking and energy capacities across the electrical system and we pass on the attendant energy savings to customers. Utilities and consumers benefit through increased electric system reliability and reduced price volatility.

Figure 8:
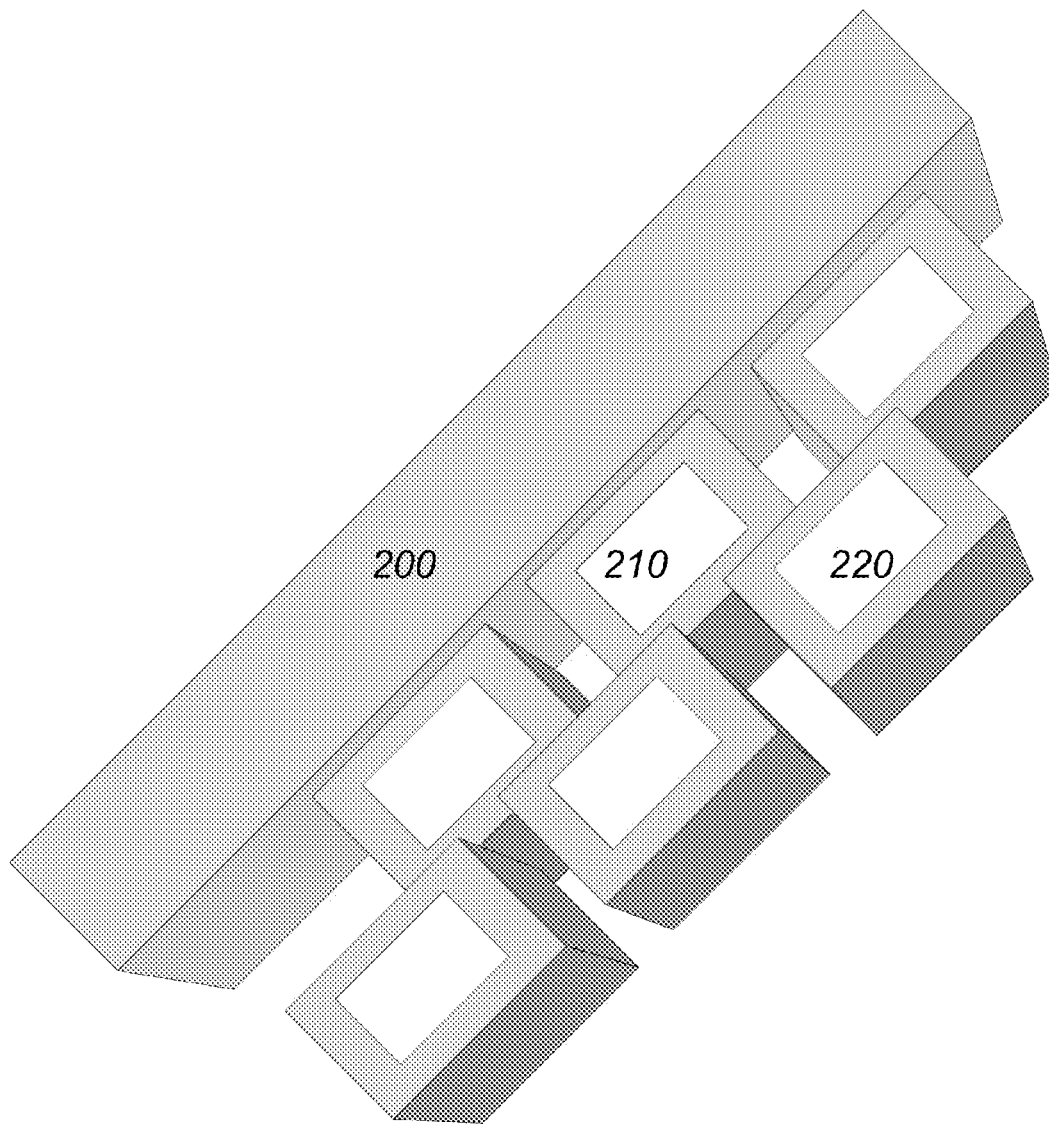
Figure 9:
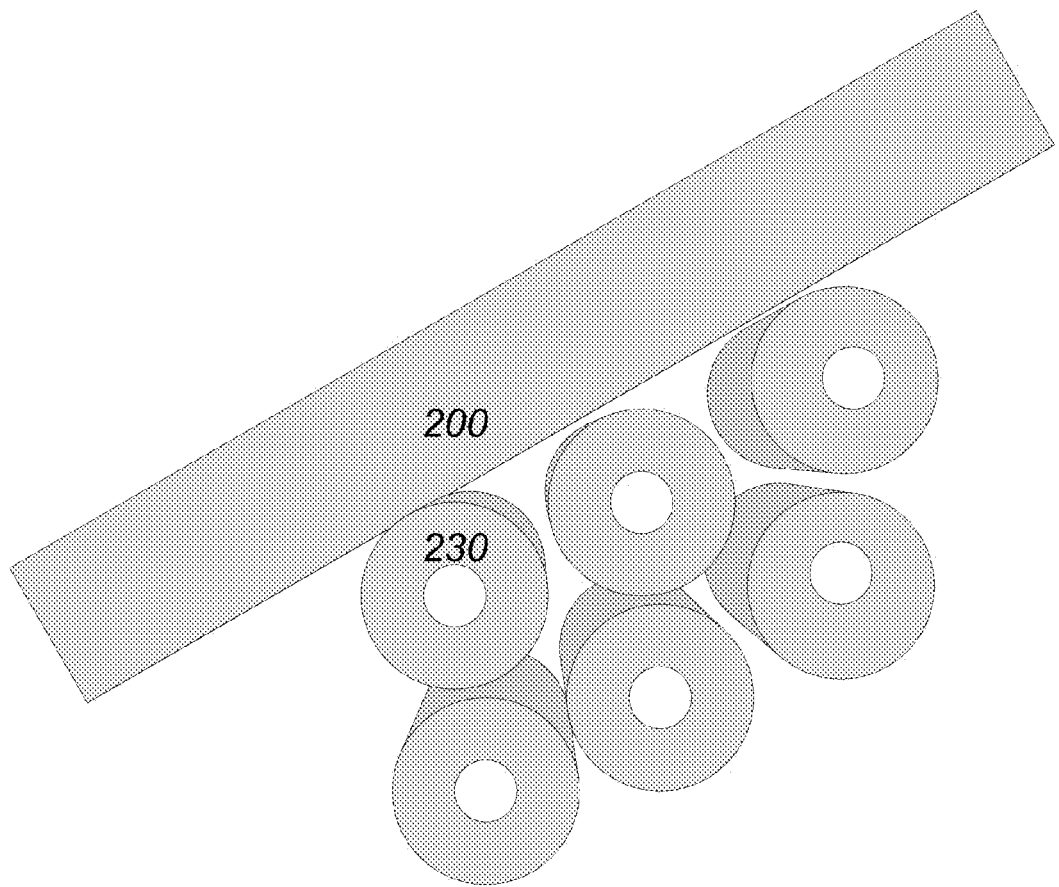

FIG. 8 shows an embodiment with two layers of PCM structures 210 and 220. FIG. 9 shows an embodiment with cylindrical PCM structures 230.

Figure 10A:
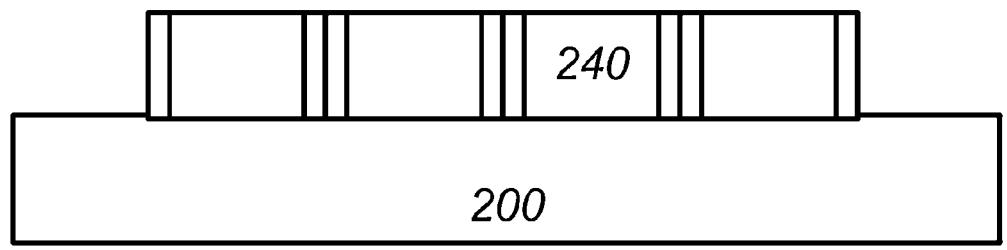
Figure 10B:
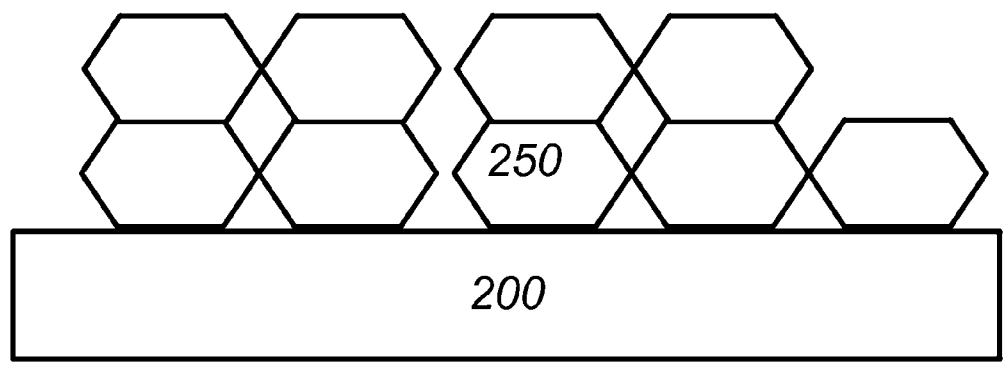
Figure 10C:
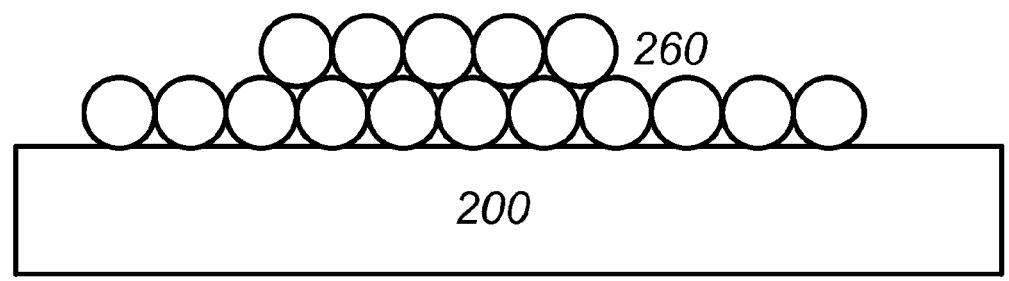

FIGS. 10A-10C show alternative embodiments. In FIG. 10A, the structure 240 containing the PCM is rectangular. In FIG. 10B, a honeycomb structure 250 provides strength and thermal conductance to maximize energy transfer between ambient air and the PCM material. In FIG. 10C, the structure 260 is cylindrical. Alternatively, the structure 260 can be a layer of PCM balls glued or attached to the tile 200.

Figure 11:
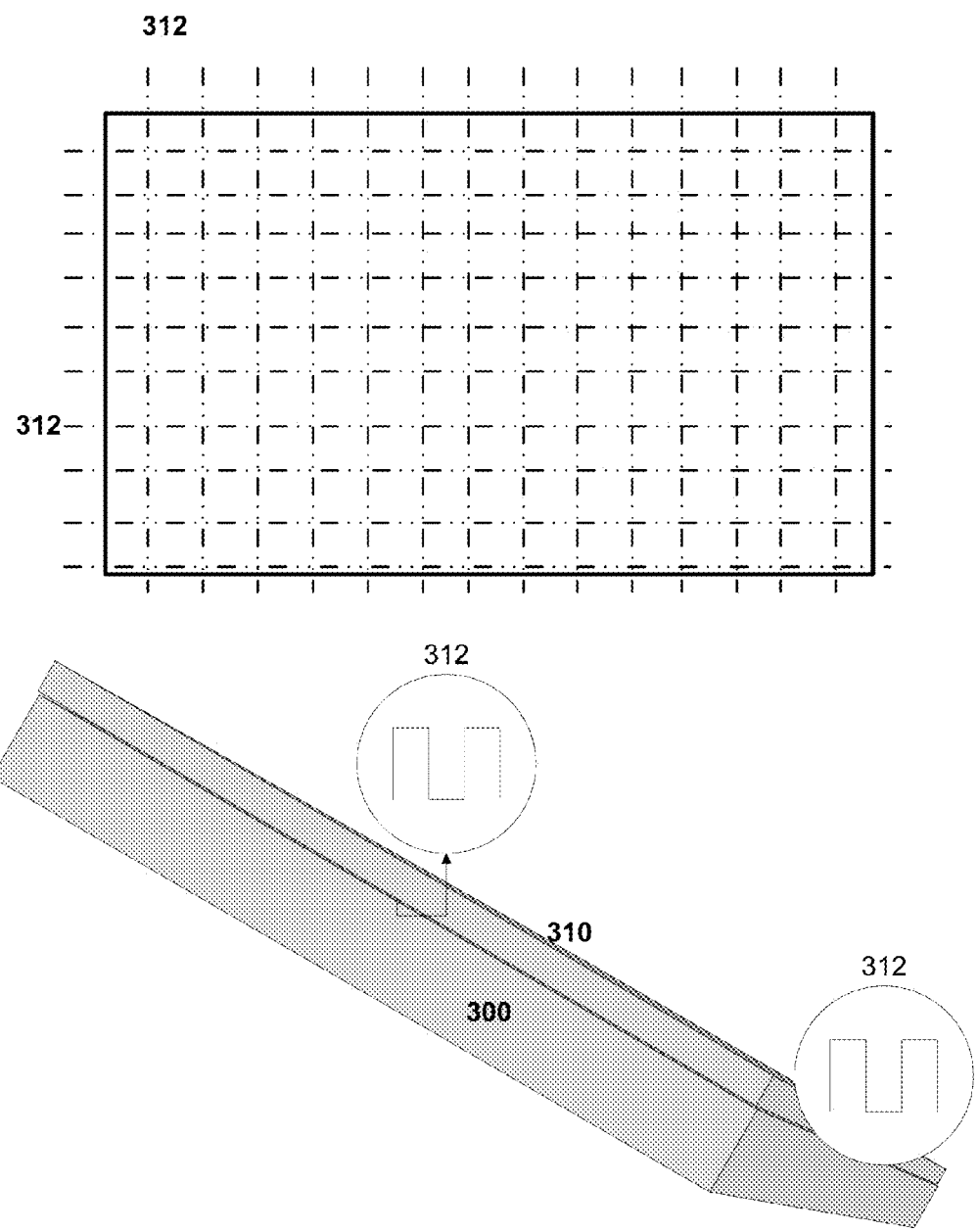

FIG. 11 shows one embodiment with multi-directional air flow. In this embodiment, a tile or floor panel 300 has a PCM layer 310 with a plurality of ports 312 that crisscross each other from multiple sides of the tile/floor panel so that the air flow is not blocked, regardless of the position of the tile or floor panel 300 relative to the airflow. This embodiment allows orientation free installation of the tile or floor unit. The ports can be fabricated by depositing a first layer of PCM above a finished tile/floor panel, curing the first layer of PCM, then depositing a second layer whose air flow is at a 90 degree off set to conduct air flow from a different side of the tile/panel and then curing the second PCM layer. This process can be used to fabricate as many PCM layers as desired.

The process is applicable to several porous materials including cement, ceiling tiles and gypsum wallboards. In case of gypsum wallboards, the board could be a standard board or a board with fiberglass (the fiberglass is added to increase internal bond strength). If an increase of the board internal thermal conductivity is necessary, the board could contain metallic fibers. If an amount of PCM larger than what the board can retain is needed, the board could contain a wetting agent. If inflammability of the board does not meet standards for the application, a fire retardant could be added to the PCM or to the board during making. The paper on the absorption face could be the one used at the present time or a more porous paper or a perforated paper or a thinner paper or another type of porous film to increase the rate of absorption.

As a general rule, during the absorption operation, the temperature of the board has to be above the melting temperature of the PCM but under the maximum temperature that the board or PCM can reach without any deterioration or degradation of properties. In the case of a paraffin absorption into gypsum wallboards, the maximum temperature is about 95° C.; over this temperature there is a risk of deterioration of the interface gypsum-paper. Laboratory tests have also shown that the rate of paraffin absorption into gypsum wallboards increases when the board temperature is increased. Another possibility is to increase the temperature only on the absorption face to concentrate the PCM in this part of the volume. This could be made by radiant heating, by a quick cooling of the other side or using a hot PCM on a colder board. The temperature of the PCM has to be above its melting point and in many cases its viscosity is reduced while heated; this improves the rate of absorption.

If not micro-encapsulated, the PCM must be compatible with the material of the board. The PCM must not represent any risk for health and has to be chemically and physically stable over a long period. The necessary amount of PCM must be retainable by the board material and a wetting agent could be added, if necessary. A list of organic PCM with possible additives is given in U.S. Pat. No. 4,797,160 by Salyer.

In an actual manufacturing process as presently practiced, the PCM absorption could be performed immediately after the boards exit or are removed from the drying oven (their temperature being at that moment about 90° C.)

When the PCM absorption operation is completed, the face of the board, through which the PCM has been absorbed, could remain as is or could be covered with a protective coating or material The surface could be covered with a paint or a varnish or a paper to prevent losses of PCM by evaporation and by capillarity with other materials in direct contact with the board. In the case of ceiling tiles and gypsum wallboards impregnated using the back surface, covering of the surface by an aluminum film could prevent heat loss or gain by radiation from inside the wall or ceiling, could prevent losses of the PCM, could prevent bacteriological deterioration of the PCM and could reduce the inflammability of the impregnated board.

Figure 12A:
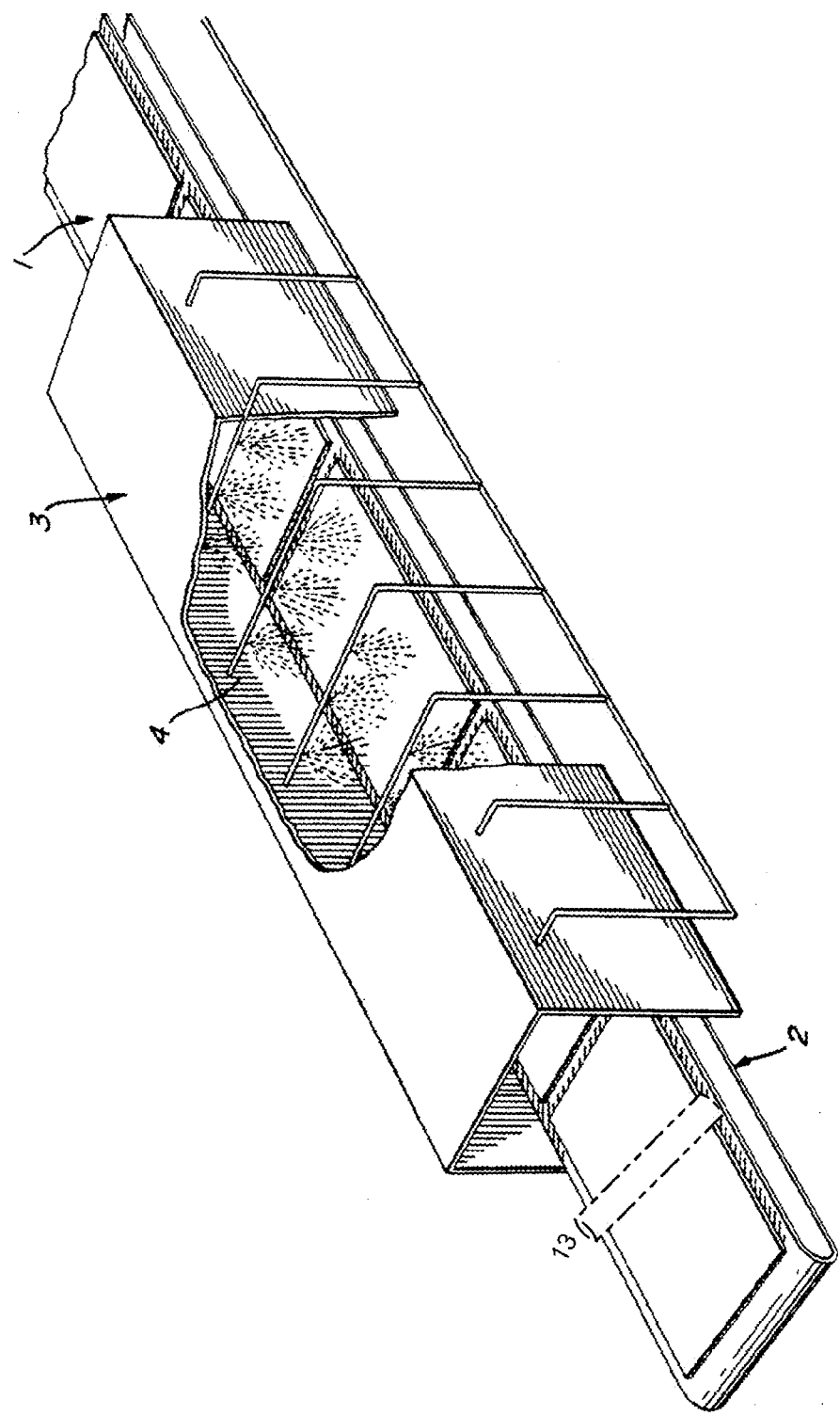
FIGS. 12A-12C show exemplary PCM fabrication equipment.

In one embodiment shown in FIG. 12A, a ceiling tile or floor panel 1 is disposed on a moving conveyor belt 2 with the surface to be impregnated on top. The board 1 enters a spray chamber 3 inside of which a uniform amount of liquid PCM 4 strikes the surface. The rate of liquid sprayed is less than the rate of absorption into the board to avoid liquid accumulation on the surface. The amount of PCM impregnated into the board depends on the belt speed or on the spray chamber length. For instance, consider a spray chamber 15 m long and a spray rate of 1 L/m 2 min; to absorb 1.25 L/m 2 into boards the belt speed has to be 0.2 m/s. A roller 11 with a plurality of predetermined shapes 13 (or pattern 13) is positioned at the output end, and the roller is positioned by a computer to form continuous grooves or ridges or patterns on the tile/panel 2 in one embodiment. If the spray is used, a texture aggregate filler mixed with said PCM, the filler can be one of: perlite, glass microballoons, glass bubbles, phenolic microballoons, and microspheres.

Perlite is a well-known generic term for naturally occurring silicous rock, namely, sodium potassium aluminum silicate, typically of volcanic origin. The distinguishing feature that sets perlite apart from other volcanic glasses is that, when heated to a suitable point in its softening range, perlite expands from four to twenty times its original volume. This expansion is known to be due to the presence of two to six percent combined water in the crude perlite rock. When quickly heated to above 1600° Fahrenheit (871° Centigrade), the crude rock pops in a manner similar to popcorn as the combined water vaporizes and creates countless tiny bubbles, which account for the amazing light weight and other well-known exceptional properties of expanded perlite. This expansion process also creates perlite's white color, and the color of expanded perlite ranges from snowy white to grayish white. Because perlite is a form of natural glass, it is classified as chemically inert and has a pH of approximately 7.

A suitable and preferred aggregate for use in the coating of the present invention is hollow glass microspheres of expanded perlite sold under the trademark DICAPERL and manufactured by Grefco, Inc., 3435 W. Lomita Boulevard, Torrance, Calif. 90509. The DICAPERL expanded perlite is amorphous mineral silicate (sodium potassium aluminum silicate of volcanic origin) containing a low percentage (less than 1%) of crystalline silica, and this aggregate has a variety of sphere sizes denoted by product sizes DICAPERL HP-120, HP-220, HP-520, and HP-820.

DICAPERL expanded perlite is commonly used in the fiberglass industry as a lightweight filler for extending resin and for lightweight putties. Such fillers are relatively inert organic or inorganic materials that are added to plastics resins or gel coats for special flow characteristics, to extend volume, and to lower the cost of a fiberglass article being produced. DICAPERL expanded perlite belongs to a group of fillers called "lightweight fillers" that are able to reduce densities to those approaching wood. Such lightweight fillers are able to do this because they contain an air void that displaces volume and lowers the bulk density. While there are various types of lightweight fillers, they are all fragile and can be easily broken with high shear mixing. Once the particle has been fractured, the lower weight advantage is lost. There are several known lightweight fillers, namely, the group consisting of perlite, glass microballoons glass bubbles, phenolic microballoons, Q cel microspheres, and extendospheres.

Figure 12B:
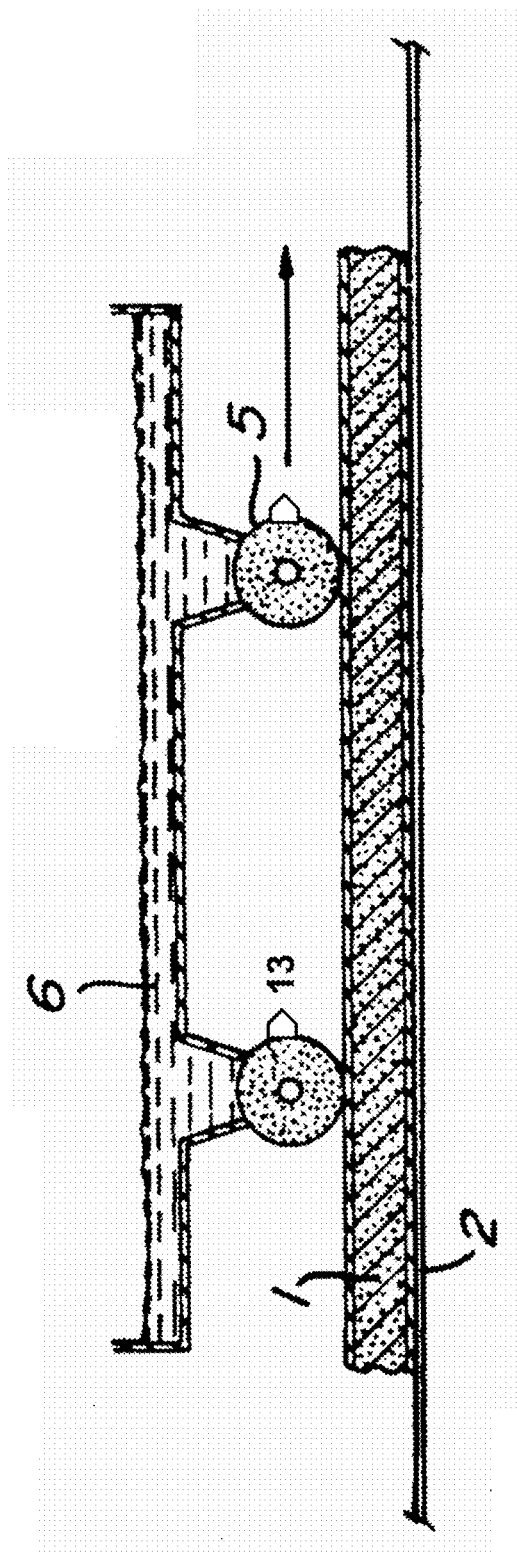

In another embodiment, to provide for textured finish that enables high thermal interaction with air flow, the PCM can include large and/or heavy aggregate such as river sand or portland cement, as well as stucco-like finishes that can be shot through hopper guns or applied using a trowel or a paint roller. The texture can be varied by the weight and size of aggregate, the thickness of the medium holding the aggregate, and the manner of application (hopper gun, trowel, or roller). For example, in FIG. 12B the sprayers are replaced by successive porous rolls 5 continuously fed with liquid PCM 6. The texture alone may be sufficient for thermal interaction with air flow, and the rolls 5 may additionally provide a series of predetermined shapes 13 that form continuous grooves or ridges or patterns on the finished tile or panel 2.

Figure 12C:
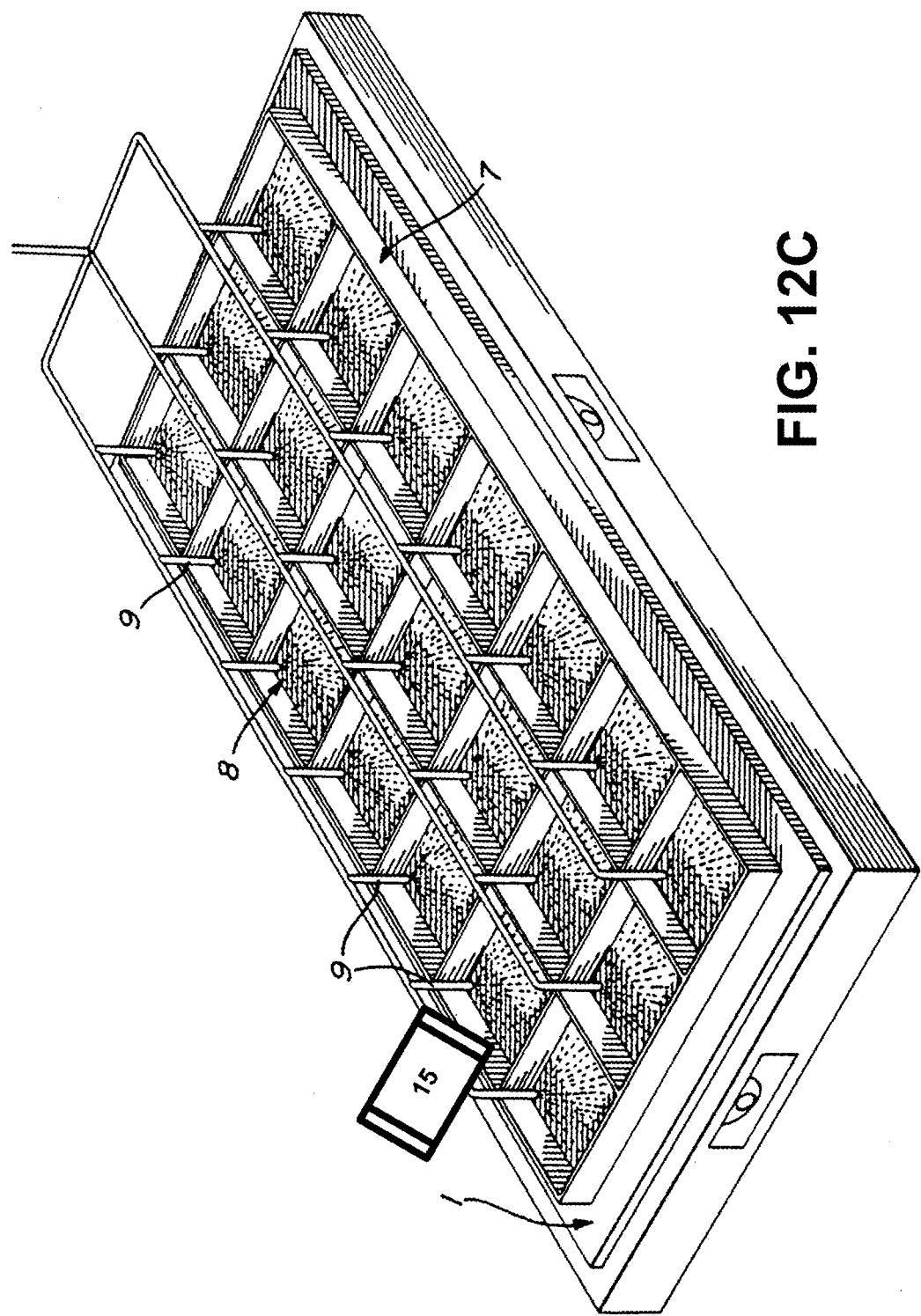

The flooding process shown in FIG. 12C is better adapted to a small scale production. The board 1 is disposed at level and has its surface to be impregnated on top. A grid 7 is placed on the surface to create separate small surfaces to flood with the desired amount of liquid PCM 8 released by hopper gun nozzles or spouts 9. The PCM can include large and/or heavy aggregate such as river sand or portland cement, as well as stucco-like finishes that can be shot through hopper guns or applied using a trowel or a paint roller. The result is a highly rugged texture that interacts with conditioned air flow. Afterward, a template 15 containing the desired shape may optionally be stamped on the board 1 to form grooves or ridges or patterns on the finished tile.

In another alternative, the surface to be impregnated with solid PCM or partially melted PCM when the board is hot or on a cold board which is heated. If the rate of melting is lower than the rate of absorption, no liquid accumulation will occur on the surface.

Figure 13A:
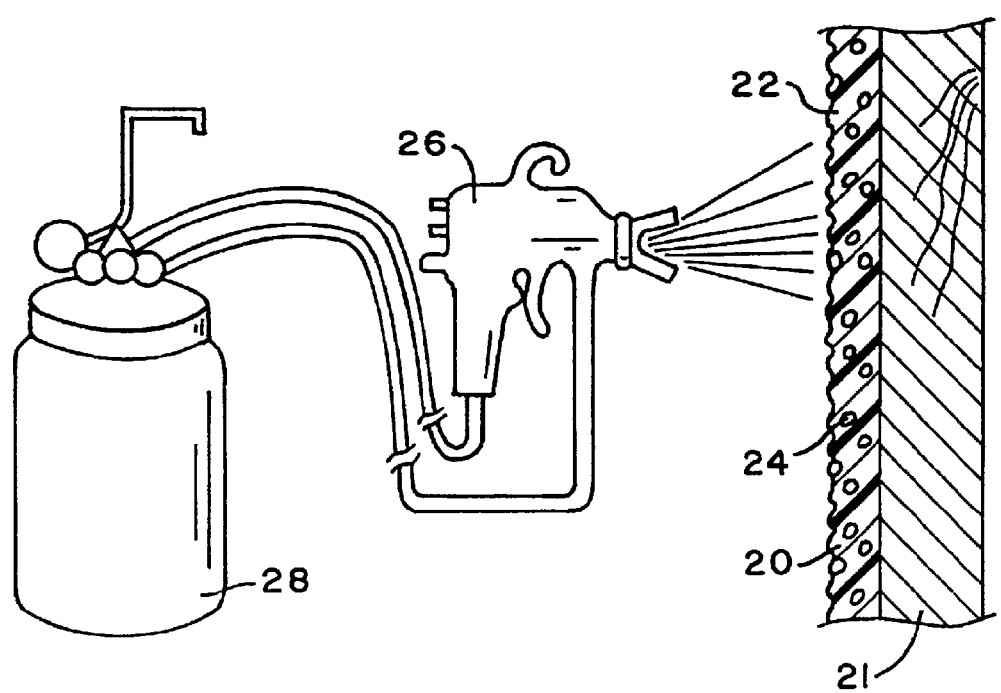
FIG. 13A shows a field embodiment for adding the PCM materials in the field.

FIG. 13A shows a field embodiment for adding the PCM materials in the field.

Referring to FIG. 13A, a sprayable textured coating 20, shown being sprayed onto a surface 21, comprises melted PCM 22 into which is mixed a texture aggregate filler 24, for example perlite as described above. It shall be understood that the scale of the coating 20 and surface 21 is greatly exaggerated, for the sake of illustration, with respect to the spray gun 26 and supply vessel 28. Surface 21 may be, for example, ceiling tile, floor tile, or objects made of fiberglass, metal, masonry, high-density foam, painted wood and other materials used on the interior and exterior of buildings.

Figure 13B:
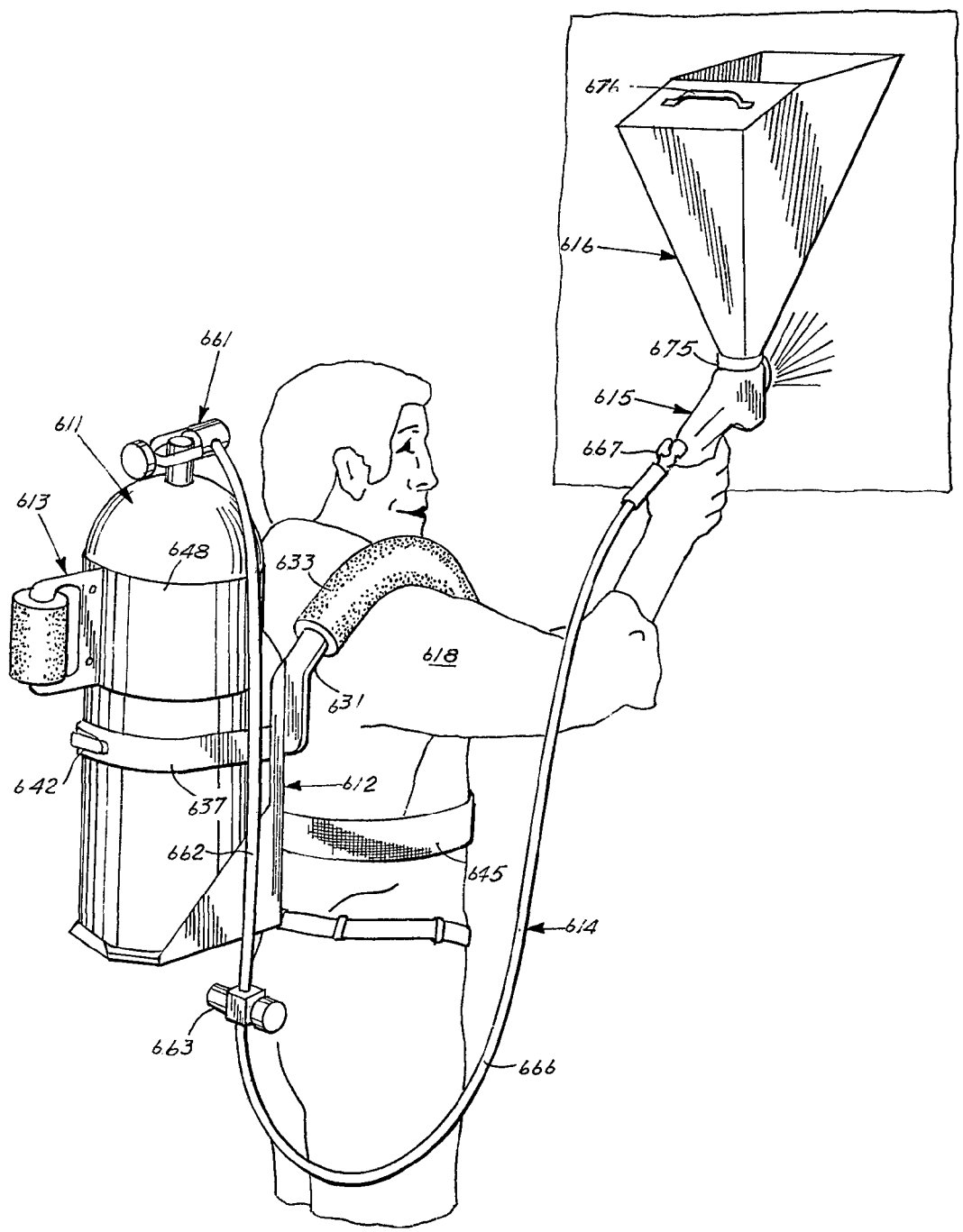
FIG. 13B shows a self-contained portable pressure apparatus and hand spray gun assembly in an operating position.

Referring now to the drawings, there is shown self-contained portable pressure apparatus and hand spray gun assembly particularly suitable for spraying a texture coating material on floors, walls, ceilings, etc. which in FIG. 13B is shown in an operating position. The apparatus shown in general is comprised of a pressurized air tank or cylinder 611 releasably mounted on a backpack carrier 612 together with a handle attachment 613 releasably fastened to the tank. A pressure control and coupling line 614 is coupled between an outlet of the tank and an inlet of a hand spray gun 615 having a feed hopper 616. The backpack tank carrier 612 is positioned on the back of a user represented at 618 and supports the pressurized air tank 611 while the spray gun 615 is held in one hand with the line 614 being sufficiently long to afford ease of movement of the spray gun. The pressurized tank 611 is a conventional high pressure air cylinder or bottle normally filled with compressed air to a pressure of about 2,500 pounds per square inch, the tank having an on-off control valve 620 on top regulated by a knob 621 and also having a tapered recess around an outlet 622 surrounded by an O-ring 623. The pressurized tank 611 complies with OSHA safety standards.

The backpack tank carrier 612 comprised of a generally L-shaped support frame adapted for supporting the tank having a flat base plate with an upturned retaining flange on one edge and an upright support plate extending up from an edge of the base at right angles thereto and opposite the retaining flange for providing a back side for supporting the tank. A side gusset plate is secured at the side at each corner between the base plate and upright support plate. An auxiliary plate is secured across the upright support plate providing a pair of side extensions beyond the side edges of the upright support plate. A rigid shoulder strap is affixed at one end on a side extension of the auxiliary plate to be essentially flush with plate and extends up, out away from and back down so as to be generally arcuate to fit over the shoulders of the user. In turn, a rigid shoulder strap is affixed to the other side extension of the auxiliary plate. A cushion member of a rubber or rubberized material fits over the strap and a similar cushion member on strap to engage the shoulders of the user for comfort. The shoulder straps are constructed and arranged on the frame so that when disposed on its side with the corner of the frame on a support surface, the shoulder straps dispose the tank at an angle of inclination with the upper end portion of the tank substantially above the support surface and the angle and weight distribution of the tank is such that there is no tendency to tip over toward the top so as to damage the tank valve 620. In this way the tank valve 620 is protected against an accidental sharp blow or the like.

For releasably securing the tank to the carrier frame there is shown an arcuate stationary arm 36 that is affixed at one end to an upper portion of the upright support plate 27 and is curved to extend partially around the tank and an arcuate movable arm 37 that is pivotally attached to the upright support plate 27 by means of a hinge 38 so that it will extend partially around the opposite side and co-operate with the stationary arm 36 to secure the tank to the carrier. A releasable buckle-type fastener is secured at the free ends of the support arms. This fastener is conventional and is in the form of a hook 41 on the movable arm 37 and loop and lever member 42 on the stationary arm 36 so that when the lever is pivoted to one side it is closed and the arms are tightly held against the tank and when pivoted to the other side the loop is moved out of the hook. The movable arm 37 is shown in an open position in dashed lines at 37' in FIG. 5 allowing the tank to be removed from the carrier.

To provide for manually carrying the backpack carrier 612 and tank 611 assembly to the point of use the handle attachment 613 is releasably mounted on an upper portion of the tank. This handle attachment 613 has a C-clamp portion 648 in the form of relatively wide plate bent along its length to conform to the circular transverse cross section of the tank in a C-clamp arrangement and further has a pair of opposed extended portions 649 and 650 through which screw fasteners 651 extend so that it clamps firmly against the tank. Extension 650 is elongated and terminates in a rounded grip portion 652 covered by a cylindrical hollow cushion 653 and is also provided with a slot 654 allowing the user to insert the fingers into the slot and grip the cushion and grip portion 652. The handle attachment 613 is located on a center line above the midpoint between the top and bottom of the tank so that when the handle is gripped, there is a counter balancing effect whereby the lower part of the tank remains in a dependent lowermost position.

For further releasably securing the carrier frame to the user there is provided a belt 645 that extends through a pair of slots in the support plate to extend around the body of the user together with a buckle on the free ends of the belt to fasten said free ends of the belt together.

The line pressure control and hose coupling 614 comprise a conventional pressure regulator tank valve 661 adapted to be releasably coupled to the valve 620 on the tank having an outlet coupled by a length of flexible hose 662 to the inlet of a pressure regulator 663 having a pressure indicator 64 and control knob 65. A commercially available regulator 663 is Wilkerson No. 2019-21. A length of flexible hose 666 is coupled to the outlet of the pressure gauge to the inlet of an on-off air valve 667 which in turn coupled to the inlet of the spray gun 615. Conventional brass fittings are shown on the ends of the flexible hoses and these fittings are attached to the tank valve 661, pressure regulator gauge 662 and on-off valve 667 in sequence in the flow line.

The tank valve 661 is a conventional commercially available unit and has a portion 671 that fits over the O-ring on the valve 620 and a threaded screw that releasably locks the tank valve 61 in place on the top of the tank as shown in FIG. 1. The pressure regulator tank valve 661 reduces the tank pressure from about 2,500 psi to 110 to 95 psi. In turn, the pressure gauge will control the pressure from 110 psi down to 0 psi to give a full range of pressure control for operating the spray gun or like load. The on-off valve 667 permits the selective shutting off of the pressure to the spray gun entirely.

The spray gun shown is conventional Pattern Piston such as that sold by Goldblatt. The feed hopper 616 is releasably held on the gun by a hose clamp 675 at its lower end. The feed hopper has a handle 676 and an open upper end into which the fluent coating material is poured. In the hand carrying of the apparatus, the spray gun 615 and line pressure control and coupling assembly is placed in the hopper. In one embodiment, a heater is provided to melt the PCM materials and a mixing blade is used to mix the melted PCM materials with aggregates to provide tall textures that provide thermal interactions with the conditioned air flow.

The spray gun shown has an air pressure inlet, a spring biased control trigger, a material cavity receiving material from the feed hopper 616 by gravity flow, a rubber jacket with a hollow beveled head is movable against a rubber washer whereby as the trigger is pulled back, compressed air forces the material through an aperture in the rubber washer. The gun also has a ring forming an outlet orifice alines with the rubber washer that determines the pattern. These things will affect the texture of the material being sprayed: the size of the orifice, the liquid state of the material and the air pressure.

Figure 13C:
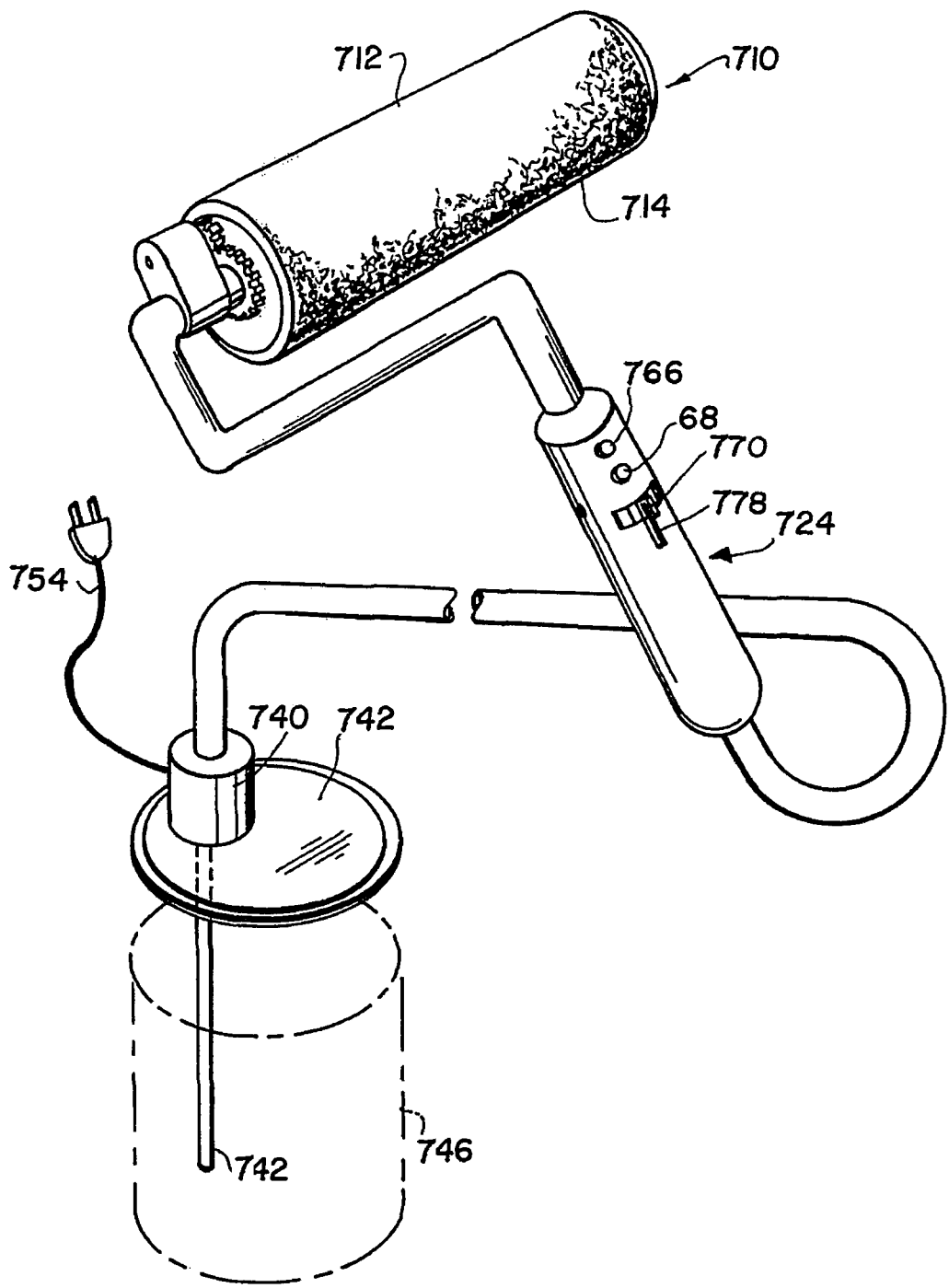
FIG. 13C shows an exemplary PCM liquid applicator similar to a paint roller but for dispensing PCM onto building materials.

FIG. 13C shows an exemplary PCM liquid applicator similar to a paint roller but for dispensing PCM onto building materials. The roller is generally designated 710 which includes a cylindrical roller 712 having an exterior cylindrical surface 714 which is porous for the flow of a PCM liquid to be applied to a surface therethrough. The outer porous surface 714 is mounted over a cylindrical core 716 which has a closure 718 at one end and an end wall 720 at an opposite end which encloses a pressure space 722 interiorly of the porous applicator wall 714 and the porous wall 716. The roller 712 is supported for rotation on support means 723 which includes a handle portion 724 and a rotational support portion 726. The handle portion 724 is connected through a tubular part 728 to the rotational support portion 726 which connects through a journal fitting 730 of the end closure 720 of the roller 712. In one embodiment three separate supply passages for the paint 732, 734 and 736 connect from a common PCM supply line 738 and pass through an outer tubular covering 42 within the section 28 to the section 26 and through to the fitting 30. These three separate supply conduits connect individual supply conduits 32', 34' and 36' inside the paint roller 12 and they have discharge openings which discharge into a radial space between the interior cylinder 16 and the roller transfer surface 14. This annular space 22 is thus maintained under pressure supplied from a pump 40 which is mounted on a paint can cover cap 42. The pump 40 takes suction through a suction line 44 which is dipped into an ordinary paint can 46 and which is closed by the cover fitting 42. The paint is discharge by the pump 40 through the discharge conduit line 38 where it branches to the conduits 32, 34 and 36 and flows through the conduits 32', 34' and 36' to the various sections of the pressure space 22 located along the length of the interior of the applicator surface 14. Paint may be returned by the build up of pressure if necessary through a return opening 48 which connects through a radial channel 50 of the fitting 30 and connects through a return line 52 for return to the pump. The amount of pressure which is maintained between the interior hollow cylinder 16 and the porous surface 14 may be varied by controlling the rate of return of the paint through the return line or by controlling the speed of operation of the pump 40.

The pump 40 is advantageously driven by a variable speed electric motor which is supplied with electricity through a battery (not shown) or through a connecting port 754. The electrical wires are transmitted through a conduit 756 up through the handle 724 and they pass through the handle and the section 728 to a drive motor 758 for driving the roller at a controlled rotational speed. While the motor is an electric motor having an output shaft which drives through gears it may advantageously comprise a fluid motor which is operated by the fluid pressure generated by the pump motor driving the paint to the roller. The gear is carried on the inner cylinder and rotates it along with the outer applicator surface at a rate which is varied in accordance with the thickness of paint to be deposited during each revolution. The handle 724 advantageously includes an on and off button 766 for the roller drive motor and an on and off button 768 for the pump motor 740. The control button 766 may also include a speed variation for the drive motor if desired. In addition the handle contains a control button 770 for distributing the paint flow from the discharge 738 of the pump 740 to each of the three separate lines. For this purpose the control 770 may be positioned in the center position at which point it has a portion which deflects a control valve pin to open the center conduit or it may be positioned to either the left or to the right of the position to separately open only the control lines by depressing valves. In addition it may be moved backwardly in an elongated slot defined in the handle to depress all three valves at once to permit flow through each one of them.

In one embodiment the handle 724 is provided with an end portion forming a PCM reservoir. The reservoir is filled by removing a cap and pouring aggregated PCM liquids into the reservoir when it is inverted and then securing the cap back in place by threading it onto a bottom handle portion. The handle contains a pump and drive motor which includes a pump suction which extends into the bottom of the reservoir into the lower portion of the cap. In this embodiment the pump may be driven at a controlled speed to discharge the paint through a discharge conduit at a controlled rate for effecting the best application onto the paint receiving surfaces. Some paint may be returned through a return line back to the reservoir and this line may advantageously have a control valve for regulating the amount of paint which is returned.

As noted in Application 20100087115, phase change materials can be encapsulated in a number of materials to contain the PCM and prevent it from leaking out when in a liquid phase. In general, a PCM can be any substance (or any mixture of substances) that has the capability of absorbing or releasing thermal energy by means of a phase change within a temperature stabilizing range. The temperature stabilizing range can include a particular transition temperature or a particular range of transition temperatures. A PCM is typically capable of maintaining a temperature condition during a time when the PCM is absorbing or releasing heat, typically as the PCM undergoes a transition between two states (e.g., liquid and solid states, liquid and gaseous states, solid and gaseous states, or two solid states). Thermal energy may be stored or removed from the PCM, and can effectively be recharged by a source of heat or cold.

PCMs that can be used include various organic and inorganic substances. Organic PCMs may be preferred for the embodiments disclosed herein. Examples of phase change materials include hydrocarbons (e.g., straight-chain alkanes or paraffinic hydrocarbons, branched-chain alkanes, unsaturated hydrocarbons, halogenated hydrocarbons, and alicyclic hydrocarbons), hydrated salts (e.g., calcium chloride hexahydrate, calcium bromide hexahydrate, magnesium nitrate hexahydrate, lithium nitrate trihydrate, potassium fluoride tetrahydrate, ammonium alum, magnesium chloride hexahydrate, sodium carbonate decahydrate, disodium phosphate dodecahydrate, sodium sulfate decahydrate, and sodium acetate trihydrate), waxes, oils, water, fatty acids, fatty acid esters, dibasic acids, dibasic esters, 1-halides, primary alcohols, secondary alcohols, tertiary alcohols, aromatic compounds, clathrates, semi-clathrates, gas clathrates, anhydrides (e.g., stearic anhydride), ethylene carbonate, methyl esters, polyhydric alcohols (e.g., 2,2-dimethyl-1,3-propanediol, 2-hydroxymethyl-2-methyl-1,3-propanediol, ethylene glycol, polyethylene glycol, pentaerythritol, dipentaerythritol, pentaglycerine, tetramethylol ethane, neopentyl glycol, tetramethylol propane, 2-amino-2-methyl-1,3-propanediol, monoaminopentaerythritol, diaminopentaerythritol, and tris(hydroxymethyl)acetic acid), sugar alcohols (erythritol, D-mannitol, galactitol, xylitol, D-sorbitol), polymers (e.g., polyethylene, polyethylene glycol, polyethylene oxide, polypropylene, polypropylene glycol, polytetramethylene glycol, polypropylene malonate, polyneopentyl glycol sebacate, polypentane glutarate, polyvinyl myristate, polyvinyl stearate, polyvinyl laurate, polyhexadecyl methacrylate, polyoctadecyl methacrylate, polyesters produced by polycondensation of glycols (or their derivatives) with diacids (or their derivatives), and copolymers, such as polyacrylate or poly(meth)acrylate with alkyl hydrocarbon side chain or with polyethylene glycol side chain and copolymers including polyethylene, polyethylene glycol, polyethylene oxide, polypropylene, polypropylene glycol, or polytetramethylene glycol), metals, and mixtures thereof.

The selection of a PCM is typically dependent upon the transition temperature that is desired for a particular application that is going to include the PCM. The transition temperature is the temperature or range of temperatures at which the PCM experiences a phase change from solid to liquid or liquid to solid. For example, a PCM having a transition temperature near room temperature or normal body temperature can be desirable for clothing applications. A phase change material according to some embodiments of the invention can have a transition temperature in the range of about −5° C. to about 125° C. In one embodiment, the transition temperature is about 6° C. to about 37° C. In another embodiment, the transition temperature is about 15° C. to about 30° C. In another embodiment, the PCM has a transition temperature of about 30° C. to about 45° C.

Paraffinic PCMs may be a paraffinic hydrocarbons, that is, hydrocarbons represented by the formula C n H n+2, where n can range from about 10 to about 44 carbon atoms. PCMs useful in the invention include paraffinic hydrocarbons having 13 to 28 carbon atoms. For example, the melting point of a homologous series of paraffin hydrocarbons is directly related to the number of carbon atoms as shown in the following table:

| Compound Name | # Carbon Atoms | Melting Point (° C.) |
| --- | --- | --- |
| n-Octacosane | 28 | 61.4 |
| n-Heptacosane | 27 | 59.0 |
| n-Hexacosane | 26 | 56.4 |
| n-Pentacosane | 25 | 53.7 |
| n-Tetracosane | 24 | 50.9 |
| n-Tricosane | 23 | 47.6 |

-continued

| Compound Name | # Carbon Atoms | Melting Point (° C.) |
| --- | --- | --- |
| n-Docosane | 22 | 44.4 |
| n-Heneicosane | 21 | 40.5 |
| n-Eicosane | 20 | 36.8 |
| n-Nonadecane | 19 | 32.1 |
| n-Octadecane | 18 | 28.2 |
| n-Heptadecane | 17 | 22.0 |
| n-Hexadecane | 16 | 18.2 |
| n-Pentadecane | 15 | 10.0 |
| n-Tetradecane | 14 | 5.9 |
| n-Tridecane | 13 | −5.5 |

Methyl ester PCMs may be any methyl ester that has the capability of absorbing or releasing thermal energy to reduce or eliminate heat flow within a temperature stabilizing range. In one embodiment, the methyl ester may be methyl palmitate. Examples of other methyl esters include methyl formate, methyl esters of fatty acids such as methyl caprylate, methyl caprate, methyl laurate, methyl myristate, methyl palmitate, methyl stearate, methyl arachidate, methyl behenate, methyl lignocerate and fatty acids such as caproic acid, caprylic acid, lauric acid, myristic acid, palmitic acid, stearic acid, arachidic acid, behenic acid, lignoceric acid and cerotic acid; and fatty acid alcohols such as capryl alcohol, lauryl alcohol, myristyl alcohol, cetyl alcohol, stearyl alcohol, arachidyl alcohol, behenyl alcohol, lignoceryl alcohol, ceryl alcohol, montanyl alcohol, myricyl alcohol, and geddyl alcohol.

Substantially any PCM (commonly a hydrophobic PCMs) which can be dispersed in water and microencapsulated by the technology referenced herein and may be useful in the present microencapsulated PCM. Alternately, two or more different PCMs can be used to address particular temperature ranges and such materials can be mixed. PCMs are commercially available from PCM Energy P. Ltd, Mumbai, India, Entropy Solutions Inc., Minneapolis, Minn., and Renewable Alternatives, Columbia, Mo.

Encapsulating a PCM that has a boiling point of about 230° C. to about 420° C., preferably about 280° C. to about 400° C., and more preferably about 300° C. to about 390° C. provides enhanced flame resistance. The PCM may be a synthetic beeswax, a non-halogenated PCM, or any currently existing or later developed PCM that has a boiling point within these temperature ranges. In one embodiment, the PCM is a synthetic beeswax (a derivative mixture of fatty acid esters) having a melting point of 28° C. and a boiling point greater than 300° C. In another embodiment, the microcapsule additionally has a flame retardant applied to the microcapsule wall as discussed in more detail below.

Any of a variety of processes known in the art may be used to microencapsulate PCMs in accordance with the present invention. Microcapsule production may be achieved by physical methods such as spray drying or by centrifugal and fluidized beds.

The microencapsulated material may be provided using any suitable capsule chemistry. Chemical techniques may be used, such as dispersing droplets of molten PCM in an aqueous solution and to form walls around the droplets using simple or complex coacervation, interfacial polymerization and in situ polymerization all of which are well known in the art. For example, methods are well known in the art to form gelatin capsules by coacervation, polyurethane or polyurea capsules by interfacial polymerization, and urea-formaldehyde, urea-resorcinol-formaldehyde, and melamine formaldehyde capsules by in situ polymerization. U.S. Pat. No.

6,619,049, herein incorporated by reference, discloses a method for microencapsulating a PCM in a melamine formaldehyde resin.

The ceiling material may comprise a polyacrylate, as described in, for instance, U.S. Pat. No. 4,552,811. Gelatin or gelatin-containing microcapsule materials are well known. The teachings of the phase separation processes, or coacervation processes, are described in U.S. Pat. Nos. 2,800,457 and 2,800,458 and gel-coated capsules, as purportedly described in U.S. Pat. No. 6,099,894 further may be employed in connection with the invention.

Interfacial polymerization is a process wherein a microcapsule wall of a polyamide, an epoxy resin, a polyurethane, a polyurea or the like is formed at an interface between two phases. U.S. Pat. No. 4,622,267 discloses an interfacial polymerization technique for preparation of microcapsules. The core material is initially dissolved in a solvent and an aliphatic diisocyanate soluble in the solvent mixture is added. Subsequently, a nonsolvent for the aliphatic diisocyanate is added until the turbidity point is just barely reached. This organic phase is then emulsified in an aqueous solution, and a reactive amine is added to the aqueous phase. The amine diffuses to the interface, where it reacts with the diisocyanate to form polymeric polyurethane shells. A similar technique, used to encapsulate salts which are sparingly soluble in water in polyurethane shells, is disclosed in U.S. Pat. No. 4,547,429.

U.S. Pat. No. 3,516,941 teaches polymerization reactions in which the material to be encapsulated, or core material, is dissolved in an organic, hydrophobic oil phase which is dispersed in an aqueous phase. The aqueous phase has dissolved materials forming aminoplast resin which upon polymerization form the wall of the microcapsule. A dispersion of fine oil droplets is prepared using high shear agitation. Addition of an acid catalyst initiates the polycondensation forming the aminoplast resin within the aqueous phase, resulting in the formation of an aminoplast polymer, which is insoluble in both phases. As the polymerization advances, the aminoplast polymer separates from the aqueous phase and deposits on the surface of the dispersed droplets of the oil phase to form a capsule wall at the interface of the two phases, thus encapsulating the core material. This process produces the microcapsules. Polymerizations that involve amines and aldehydes are known as aminoplast encapsulations.

Urea-formaldehyde (UF), urea-resorcinol-formaldehyde (URF), urea-melamine-formaldehyde (UMF), and melamine-formaldehyde (MF) capsule formations proceed in a like manner. In interfacial polymerization, the materials to form the capsule wall are in separate phases, one in an aqueous phase and the other in a fill phase. Polymerization occurs at the phase boundary. Thus, a polymeric capsule shell wall forms at the interface of the two phases thereby encapsulating the core material. Wall formation of polyester, polyamide, and polyurea capsules proceeds via interfacial polymerization.

Processes of microencapsulation that involve the polymerization of urea and formaldehyde, monomeric or low molecular weight polymers of dimethylol urea or methylated dimethylol urea, melamine and formaldehyde, monomeric or low molecular weight polymers of methylol melamine or methylated methylol melamine are taught in U.S. Pat. No. 4,552,811. These materials are dispersed in an aqueous vehicle and the reaction is conducted in the presence of acrylic acid-alkyl acrylate copolymers. Preferably, the wall forming material is free of carboxylic acid anhydride or limited so as not to exceed 0.5 weight percent of the building material.

An in situ polymerization based manufacturing technique of microencapsulating phase change materials (PCMs) using polyurea-formaldehydes is taught in an article by N. Sarier and E. Onder, The Manufacture of microencapsulated phase change materials suitable for the design of thermally enhanced fabrics. Thermochimica Acta 452 (2) (2007) 149-160, herein incorporated by reference. A method of encapsulating by in situ polymerization, including a reaction between melamine and formaldehyde or polycondensation of monomeric or low molecular weight polymers of methylol melamine or etherified methylol melamine in an aqueous vehicle conducted in the presence of negatively-charged, carboxyl-substituted linear aliphatic hydrocarbon polyelectrolyte material dissolved in the vehicle is disclosed in U.S. Pat. No. 4,100,103.

A method of encapsulating by polymerizing urea and formaldehyde in the presence of gum arabic is disclosed in U.S. Pat. No. 4,221,710. This patent further discloses that anionic high molecular weight electrolytes can also be employed with gum arabic. Examples of the anionic high molecular weight electrolytes include acrylic acid copolymers. Specific examples of acrylic acid copolymers include copolymers of alky acrylates and acrylic acid including methyl acrylate-acrylic acid, ethyl acrylate-acrylic acid, butyl acrylate-acrylic acid and octyl acrylate-acrylic acid copolymers. A method for preparing microcapsules by polymerizing urea and formaldehyde in the presence of an anionic polyelectrolyte and an ammonium salt of an acid is disclosed in U.S. Pat. Nos. 4,251,386 and 4,356,109. Examples of the anionic polyelectrolytes include copolymers of acrylic acid. Examples include copolymers of alkyl acrylates and acrylic acid including methyl acrylate-acrylic acid, ethyl acrylate-acrylic acid, butyl acrylate-acrylic acid and octyl acrylate-acrylic acid copolymers.

Other microencapsulation methods are known. For instance, a method of encapsulation by a reaction between urea and formaldehyde or polycondensation of monomeric or low molecular weight polymers of dimethylol urea or methylated dimethylol urea in an aqueous vehicle conducted in the presence of negatively-charged, carboxyl-substituted, linear aliphatic hydrocarbon polyelectrolyte material dissolved in the vehicle, is taught in U.S. Pat. Nos. 4,001,140; 4,087,376; and 4,089,802.

In one embodiment, the building material for encapsulating the PCM contains a melamine-formaldehyde resin. In an alternate embodiment, the microcapsule may be a dual walled capsule. Dual wall capsules, such as first wall-second wall structures of an acrylic polymer and an urea-resorcinal-gluteraldehyde (URG), an acrylic polymer and an urea-resorcinal-formaldehyde (URF), a melamine-formaldehyde and a URF, a melamine-formaldehyde and a URG, or a URF and a melamine-formaldehyde, respectively, as disclosed in U.S. Published Patent Application 2006/0063001, herein incorporated by reference.

The microcapsules will typically have a relatively high payload of PCM of about 60% to 85%. In one embodiment, the phase change material is present at about 70% to 80% by weight. The PCM may be one or a combination of the PCMs described above.

The size of the microcapsules typically range from about 0.01 to 100 microns and more typically from about 2 to 50 microns. The capsule size selected will depend on the application in which the microencapsulated PCM is used. For example, they may be used as the thermal transfer medium in a heat transfer fluid for use in lasers, supercomputers and other applications requiring high thermal transfer efficiencies. They also may be coated on fibers or incorporated into fibers to prepare insulative fabrics. They may be added to plastics or resins such as polypropylene and acrylics and spun into fibers or extruded into filaments, beads or pellets useful in thermal transfer applications such as insulative apparel such as clothes, shoes, boots, etc., building insulation for use in ceilings, floors, etc. For use in heat transfer fluids, the capsule size may range from about 1 to 100 microns and more typically from about 2 to 40 microns. For use in fibers, yarns, or textile the capsule size may be about 1 to 15 microns or about 2 to 10 microns. For other applications, the capsule size range is about 0.5 microns to about 10 microns.

These microencapsulated PCM may be made of different tile thicknesses. Typically the tile material should be thick enough to contain the PCM while in its liquid phase. The thickness may be about 0.1 to about 0.9 microns. In one embodiment, the tile may be about 0.2 to about 0.6 microns thick with a nominal (mean) thickness of about 0.4 microns. The capsule walls should be sufficiently thick to avoid rupture when processed into other materials or products, such as those discussed above.

In another embodiment, the gel-coated PCMs can be used in coatings of all types, including paints, gels, and a variety of other coatings. The coatings can include materials such as ABS, SAN, acetal, acrylic, alkyd, allyl, amino, cellulosic, epoxy, fluoroplastics, liquid-crystal polymers, nylon, phenolic, polyamide, polyimide, polycarbonate, polyester, polyetherketone, polyetherimide, polyolefin, polyphenylene ether, polyphenylene sulfide, polystyrene, polyurethane, polyvinyl chloride, sulfone polymers, laminated plastics, nitrile rubber, butyl rubber, viton, mylar, thermoplastic elastomers, thermoplastic rubbers, ethylene vinyl acetate, polyureas, Kevlar, aramide, aromatic polyamides, fluorinated hydrocarbons, silicone and parylene.

Those skilled in the art will appreciate that the capsule size and wall thickness may be varied by many known methods, for instance, adjusting the amount of mixing energy applied to the materials immediately before wall formation commences. Capsule wall thickness is also dependent upon many variables, including the speed of the mixing unit used in the encapsulation process.

Other microencapsulation processes known in the art or otherwise found to be suitable for use with the invention may be employed. In one embodiment, a plurality of microencapsulated PCMs having the same or different encapsulation may be contained in "macrocapsules" as disclosed in U.S. Pat. Nos. 6,703,127 and 5,415,222, herein incorporated by reference in their entirety. Macrocapsules may provide a thermal energy storage composition that more efficiently absorbs or releases thermal energy during a heating or a cooling process than individual microencapsulated PCMs.

Various flame retardants may be used to enhance flame resistance of an encapsulated phase change material. In one embodiment, the flame retardant may contain one or more of boric acid, borates, ammonium polyphosphates, sodium carbonate, sodium silicate, aluminum hydroxide, magnesium hydroxide, antimony trioxide, various hydrates, tetrakis(hydroxymethyl)phosphonium salts, halocarbons, including chlorendic acid derivates, halogenated phosphorus compounds including tri-o-cresyl phosphate, tris(2,3-dibromopropyl)phosphate (TRIS), bis(2,3-dibromopropyl)phosphate, tris(1-aziridinyl)-phosphine oxide (TEPA), and others.

The flame retardant may be applied to the wall material as a solution, dispersion, a suspension, or a colloid that forms a coating on the wall material to provide flame resistant characteristics to the microencapsulated PCM. The flame retardant may be present in an amount to make about a 2% to about a 50% flame retardant solution, dispersion, suspension, or colloid. In another embodiment, the flame retardant may be present in an amount to make about a 5% to about a 30% flame retardant solution, dispersion, suspension, or colloid. Any solvent may be used dissolve, mix, or suspend the flame retardant without decomposing or reacting with the flame retardant, the wall material, or any other solvents present. The solvent may be water, an aliphatic or aromatic solvent, and/or an alcohol. The application of the flame retardant as a solution, dispersion, suspension, or colloid (the flame retardant medium) is advantageous because it provides a relatively simple manufacturing process as seen in the Examples below and described in more detail in the Method section below.

A method for making a microencapsulated phase change material having flame resistance may include providing an encapsulated phase change material and applying a composition containing a flame retardant to the encapsulated phase change material. The flame retardant composition may contain any of the flame retardants described above or a combination thereof and may be present in a solution, dispersion, suspension, or colloid in the concentrations given above.

The flame retardant composition may be applied by spraying, pan coating, or by using a fluidized bed, industrial blender, or other various types of mixers and/or blenders. In another embodiment, the encapsulated PCMs may be suspended in a composition containing the flame retardant to allow a coating to form on the outer surface of the microcapsule wall. The composition may be a solution, dispersion, suspension, or colloid, as described above. The encapsulated PCMs way be added to the composition as a powder, wet cake, or as a slurry. A slurry may be advantageous in mixing more quickly with the composition.

The flame retardant is applied in an amount of about 5% to about 30% flame retardant by weight of the coated microcapsule.

To vary the percent by weight of the flame retardant coating on the microencapsulated PCMS the amount of time the microencapsulated PCMs remains in or is coated with the flame retardant medium may be altered. Theoretically, there is likely an amount of time that even if exceeded will not deposit more flame retardant on the microcapsules as an equilibrium state may be achieved between the flame retardant in the flame retardant medium and the amount of flame retardant deposited on the microcapsules. Alternately, the amount or concentration of flame retardant in the flame retardant medium may also affect the amount of flame retardant deposited as well as the time it takes to deposit the desired amount of flame retardant. One skilled in the art will also recognize that other factors may affect the time and amount of flame retardant deposited such as temperature, pressure, agitation of the medium, etc.

After the flame retardant coating is applied the coated microcapsules are removed from the composition and are dried. The removal of the coated encapsulated PCMs from the solution, dispersion, suspension, or colloid may be by any conventional process, such as filtering or centrifuging. The coated encapsulated PCMs may be dried thereafter using any convention process, such as air drying, oven drying, spray drying, or fluid bed drying. The coated microcapsules may be dried to about a 5% moisture content or less. The microcapsules may have a moisture content of about 1% to about 2%. Alternately, rather than drying the coated encapsulated PCMS, the microcapsules may be contained as a wet cake. The wet cake may have a moisture content of about 30%.

The coated encapsulated PCMs may have a variety of uses because many industries may be able to take advantage of the coated capsules flame resistance. The flame resistant encapsulated PCMs may be incorporated into a number of articles such as textile materials, building materials, packaging materials, and electronic devices. Textile materials may have the coated encapsulated PCMs incorporated into the fiber and/or fabrics they are made of The textile material may be used to make clothing items, window treatments, and medical wraps to provide flame resistance and the thermal characteristics of the PCM. Building materials may include the flame resistant encapsulated PCMs on or in them, such as insulation, lumber, roofing materials, and floor and ceiling tiles. Packaging materials may include food serving trays, bubble wrap, packaging peanuts, labels, cardboard, paper, and insulated containers. Electronic devices may include the coated encapsulated PCMs to remove heat from electrical components that may be damaged by heat, such as computers, televisions, or any other machine with electronic components. The coated encapsulated PCMs may also be incorporated into a binder to provide a coating useful in many applications, such as paints, sprays, etc. that may even be useful in applying the coated encapsulated PCMs to the items described above.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method to fabricate a building structure, comprising:
   a. mixing a texture aggregate filler mixed with a phase change material (PCM), said filler being selected from the group consisting of perlite, glass microballoons, glass bubbles, phenolic microballoons, and microspheres;
   b. placing the PCM with the filler on a surface exposed to a conditioned air flow and shaped to increase thermal contact between the PCM and the conditioned air flow;
   c. extruding the elongated hollow support structures to attach the PCM structures with a predetermined cross-sectional shape; and
   d. operating an appliance including a memory storage location storing a flag indicative of a period when a current alternating current (AC) duty cycle from an electric grid differs from a specified AC duty cycle by a predetermined variance, the appliance including a controller coupled to the flag to autonomously place the appliance in an energy shedding mode during a predicted DR period.

2. The method of claim 1, wherein the building structure comprises an underfloor air distribution (UFAD) panel.

3. The method of claim 1, comprising forming elongated hollow support structures to attach the PCM.

4. The method of claim 3, wherein the elongated hollow PCM structures are fabricated in advance and attached to the building material during fabrication or during shipping.

5. The method of claim 1, comprising forming a first layer of elongated hollow PCM structures and a second layer of elongated hollow PCM structures above the first layer.

6. The method of claim 1, comprising forming air channels with grooves positioned on two adjacent sides of the building materials to allow air flow through the PCM regardless of orientation of the building material.

7. The method of claim 1, comprising one of: spraying PCM onto the surface before forming air channels with a shaped tool; pouring PCM onto the surface before forming air channels with a shaped stamping tool; rolling PCM onto the surface before forming air channels with a shaped roller; dipping the surface into PCM and then forming the air channels with a shaped tool.

8. The method of claim 1, comprising microencapsulating the PCM.

9. The method of claim 1, comprising characterizing PCM properties and predicting building performance with the characterized PCM properties.

10. The method of claim 1, comprising pre-charging a building by using an active unit for removing heat and cooling the PCM during a period of non-peak energy consumption and reducing energy consumption during a peak period.

11. The method of claim 1, comprising providing a refrigerator with an ice energy storage chamber providing a predetermined cold energy for a refrigerated volume for the predicted DR period; and a fan to circulate cold air from the ice energy storage chamber inside the refrigerated volume during the predicted DR period, wherein the refrigerator can include a phase change material coupled to the refrigerated volume to maintain the refrigerated volume at a predetermined temperature during a predicted DR period.

12. The method of claim 1, comprising providing a water heater with a back-up heated energy storage chamber to store a reserve heated water to maintained a predetermined temperature output for the water heater during the predicted DR period; and a valve to mix the reserve heated water with the water in the main water heater tank during the predicted DR period, wherein the water heater includes a phase change material coupled to the water volume to maintain the water at a predetermined temperature during the predicted DR period, the water heater controller modulating heater operation to reduce power consumption during a predicted DR period, and the controller precharging the water heater prior to the predicted DR period or based on weather or notice from an authority.

13. A method to fabricate a building structure, comprising:
 a. mixing a phase change material (PCM) with a texture aggregate filler, said filler including one of: perlite, glass microballoons, glass bubbles, phenolic microballoons, microspheres;
 b. spraying or rolling the aggregate filler PCM on a surface exposed to a conditioned air flow; and
 c. operating an appliance including a memory storage location storing a flag indicative of period when a current alternating current (AC) duty cycle differs from a specified AC duty cycle by a predetermined variance, the appliance including a controller coupled to the flag to autonomously place the appliance in an energy shedding mode during a predicted DR period.

14. The method of claim 13, comprising texturing or shaping the surface to increase thermal contact between the PCM and a conditioned air flow.

15. The method of claim 13, comprising performing on-site retrofitting of an existing building material with PCM thereon.

16. The method of claim 13, comprising spraying or rolling the aggregate filler PCM on awall, floor tile or a ceiling tile.

17. The method of claim 13, comprising microencapsulating the PCM prior to mixing the PCM with the filler.

18. The method of claim 13, comprising pre-charging a building by actively using energy for cooling the PCM during a period of non-peak energy consumption and reducing energy consumption during a peak period.

19. The method of claim 18, comprising modulating operations of appliances to avoid stressing the electrical grid.

* * * * *